US008851616B2

(12) United States Patent
Moreau et al.

(10) Patent No.: US 8,851,616 B2
(45) Date of Patent: Oct. 7, 2014

(54) PRINT HEAD PRE-ALIGNMENT SYSTEMS AND METHODS

(71) Applicant: Vistaprint Technologies Limited, Hamilton (BM)

(72) Inventors: Jean-Michel Moreau, Winterthur (CH); Harald Feistenauer, Winterthur (CH); Hung Viet Ngo, Buerglen (CH); Patrick Stepanek, Zollikon (CH)

(73) Assignee: Vistaprint Schweiz GmbH, Winterthur (CH)

( * ) Notice: Subject to any disclaimer, the term of this patent is extended or adjusted under 35 U.S.C. 154(b) by 21 days.

(21) Appl. No.: 13/719,943

(22) Filed: Dec. 19, 2012

(65) Prior Publication Data

US 2014/0168293 A1 Jun. 19, 2014

(51) Int. Cl.
*B41J 29/393* (2006.01)
*B41J 2/145* (2006.01)

(52) U.S. Cl.
CPC ...................... *B41J 2/145* (2013.01)
USPC .......................................................... 347/19

(58) Field of Classification Search
CPC .... B41J 2/04505; B41J 2/2135; B41J 25/001; B41J 19/145
USPC .............. 347/19, 49, 42, 47, 20, 87
See application file for complete search history.

(56) References Cited

U.S. PATENT DOCUMENTS

| 4,074,946 | A | 2/1978 | Swearingen |
| 4,987,526 | A | 1/1991 | Slocum et al. |
| 5,167,464 | A | 12/1992 | Voellmer |
| 5,250,956 | A | 10/1993 | Haselby et al. |
| 5,592,202 | A | 1/1997 | Erickson |
| 5,678,944 | A | 10/1997 | Slocum et al. |
| 5,683,118 | A | 11/1997 | Slocum |
| 5,711,647 | A | 1/1998 | Slocum |
| 5,733,024 | A | 3/1998 | Slocum et al. |
| 5,769,554 | A | 6/1998 | Slocum |
| 5,782,184 | A | 7/1998 | Albertalli et al. |
| 5,782,445 | A | 7/1998 | Cleek |

(Continued)

FOREIGN PATENT DOCUMENTS

WO 2009/145870 12/2009

OTHER PUBLICATIONS

U.S. Patent and Trademark Office, U.S. Non-Final Office Action issued on Dec. 23, 2013 for U.S. Appl. No. 13/719,854.

(Continued)

*Primary Examiner* — Julian Huffman
(74) *Attorney, Agent, or Firm* — Jessica Costa

(57) ABSTRACT

Systems and methods for pre-aligning print head(s) to alignment adapter(s) to increase print resolution of printed matter, and to reduce offline time of a printing system due to print head alignment, include the use of an alignment adapter to which a print head is pre-aligned and which includes precision alignment features which precisely engage cooperating precision alignment features on the print head carriage mounting plate of the print head carriage. Print head(s) can be pre-aligned and fine-tuned to alignment adapter(s) even while the printing system is still in print production. Pre-aligned print head/alignment adapter assemblies can then be quickly mounted on the print head carriage using the cooperating precision alignment features of the adapter and print head carriage mounting plate. Duplicate sets of print head mounting sockets can include print heads aligned at different relative offsets (e.g., half a pixel) to increase the print resolution.

2 Claims, 24 Drawing Sheets

(56) References Cited

U.S. PATENT DOCUMENTS

| | | | |
|---|---|---|---|
| 5,821,764 A | 10/1998 | Slocum et al. | |
| 5,915,678 A | 6/1999 | Slocum et al. | |
| 6,048,048 A * | 4/2000 | Gregoire | 347/40 |
| 6,065,898 A | 5/2000 | Hale | |
| 6,104,202 A | 8/2000 | Slocum et al. | |
| 6,446,560 B1 | 9/2002 | Slocum | |
| 6,688,183 B2 | 2/2004 | Awtar et al. | |
| 6,746,172 B2 | 6/2004 | Culpepper | |
| 7,052,117 B2 | 5/2006 | Bibl et al. | |
| 7,093,827 B2 | 8/2006 | Culpepper | |
| 7,214,347 B1 | 5/2007 | Burgarella et al. | |
| 7,270,319 B2 | 9/2007 | Culpepper | |
| 7,334,880 B2 | 2/2008 | Nishiwaki et al. | |
| 7,451,596 B2 | 11/2008 | Culpepper et al. | |
| 7,475,968 B2 | 1/2009 | Watanabe et al. | |
| 7,540,200 B2 | 6/2009 | Yung et al. | |
| 7,819,501 B2 | 10/2010 | Hanchak et al. | |
| 8,231,202 B2 | 7/2012 | Bibl et al. | |
| 2005/0156963 A1* | 7/2005 | Song et al. | 347/9 |
| 2005/0280678 A1 | 12/2005 | Bibl et al. | |
| 2007/0277685 A1 | 12/2007 | James | |
| 2009/0058941 A1 | 3/2009 | Kurita et al. | |
| 2009/0231374 A1 | 9/2009 | Van de Wynckel et al. | |
| 2010/0103214 A1* | 4/2010 | Seo et al. | 347/14 |
| 2010/0245415 A1 | 9/2010 | Tsai et al. | |
| 2010/0289854 A1 | 11/2010 | Hagiwara et al. | |
| 2010/0295896 A1 | 11/2010 | Albertalli et al. | |
| 2011/0001780 A1 | 1/2011 | Amidon, Jr. et al. | |
| 2011/0316933 A1 | 12/2011 | Fishkin et al. | |
| 2012/0044296 A1 | 2/2012 | Gouch et al. | |
| 2014/0168302 A1 | 6/2014 | Ngo et al. | |
| 2014/0168303 A1 | 6/2014 | Moreau et al. | |
| 2014/0168319 A1 | 6/2014 | Moreau et al. | |

OTHER PUBLICATIONS

U.S. Patent and Trademark Office, U.S. Non-Final Office Action issued on Dec. 24, 2013 for U.S. Appl. No. 13/719,905.

U.S. Patent and Trademark Office, U.S. Non-Final Office Action issued on Feb. 14, 2014 for U.S. Appl. No. 13/719,990.

HP Designjet L65500 Printer—Maintenance and Troubleshooting Guide (Second Edition), 53 pages (2009).

Xennia, "Xenjet: The Modular Approach to Inkjet Printing Systems," http://www.xennia.com/us/products/XenJet-Auriga.asp.

Thorlabs, "TCH002 T-Cube USB Controller Hub and Power Supply, User Guide," HA0146T Rev D Apr. 2012.

Thorlabs, "TDC001 DC Serve Motor Drive, User Guide," HA0142T Rev Nov. 2011.

European Patent Office, "Notification of Transmittal of the International Search Report and the Written Opinion of the International Searching Authority, or the Declaration," mailed on Mar. 18, 2014, for International Application No. PCT/EP2013/077254.

* cited by examiner

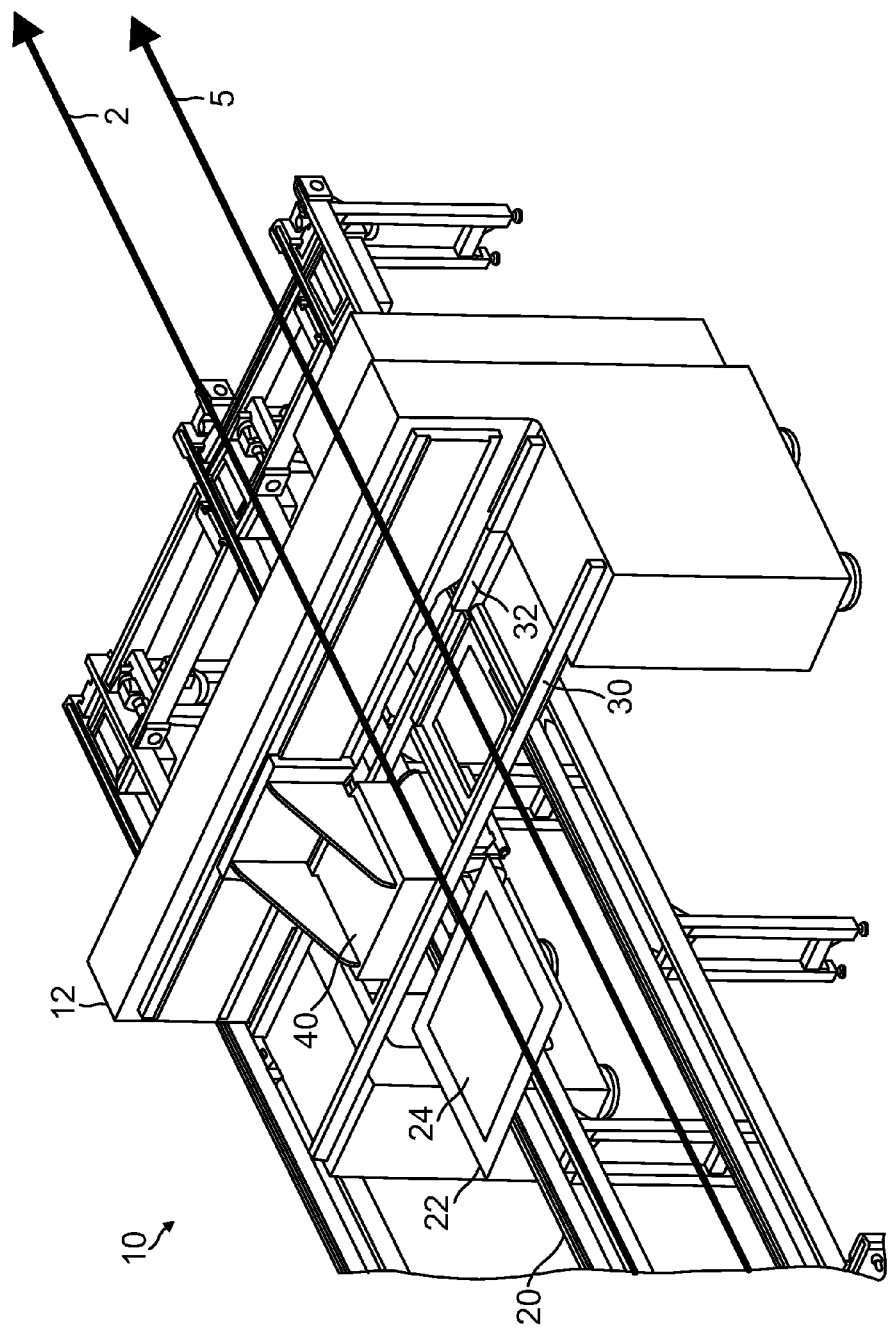
FIG. 1

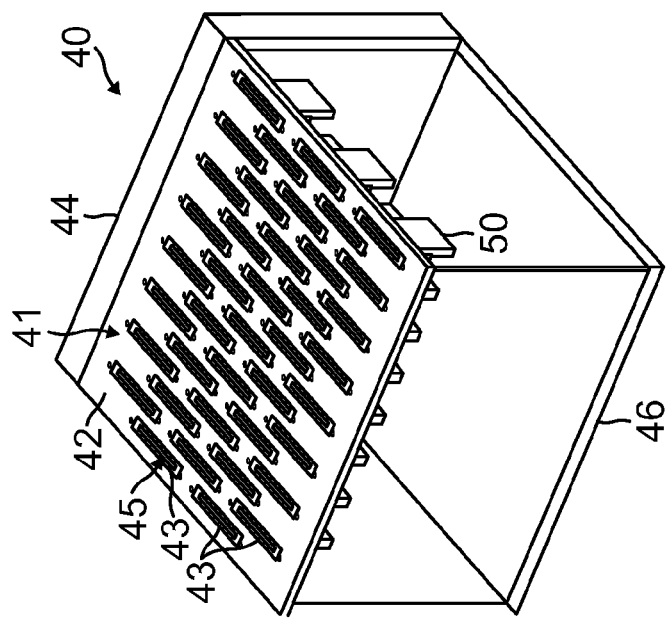
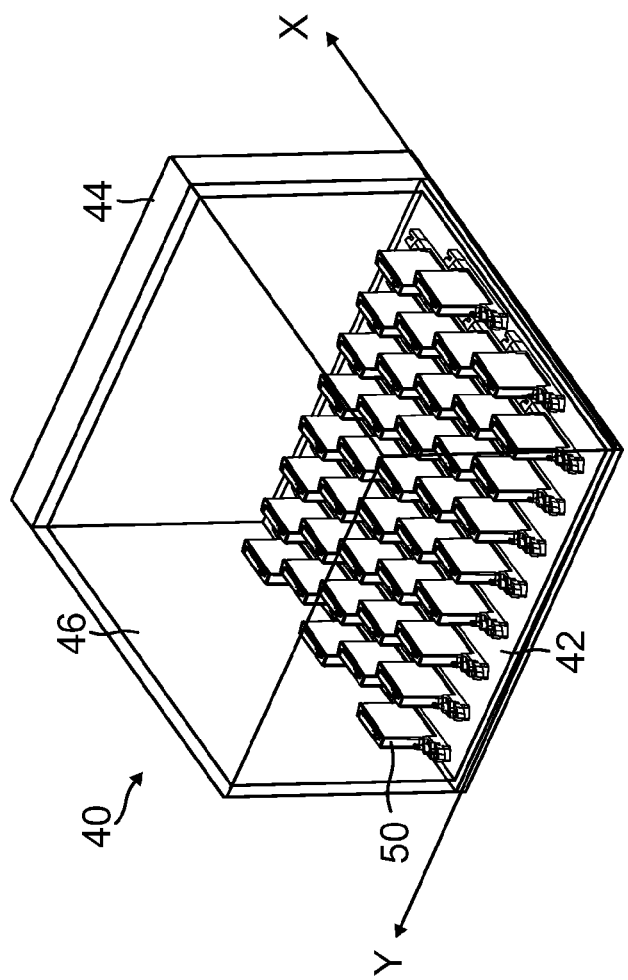
FIG. 2B
FIG. 2A

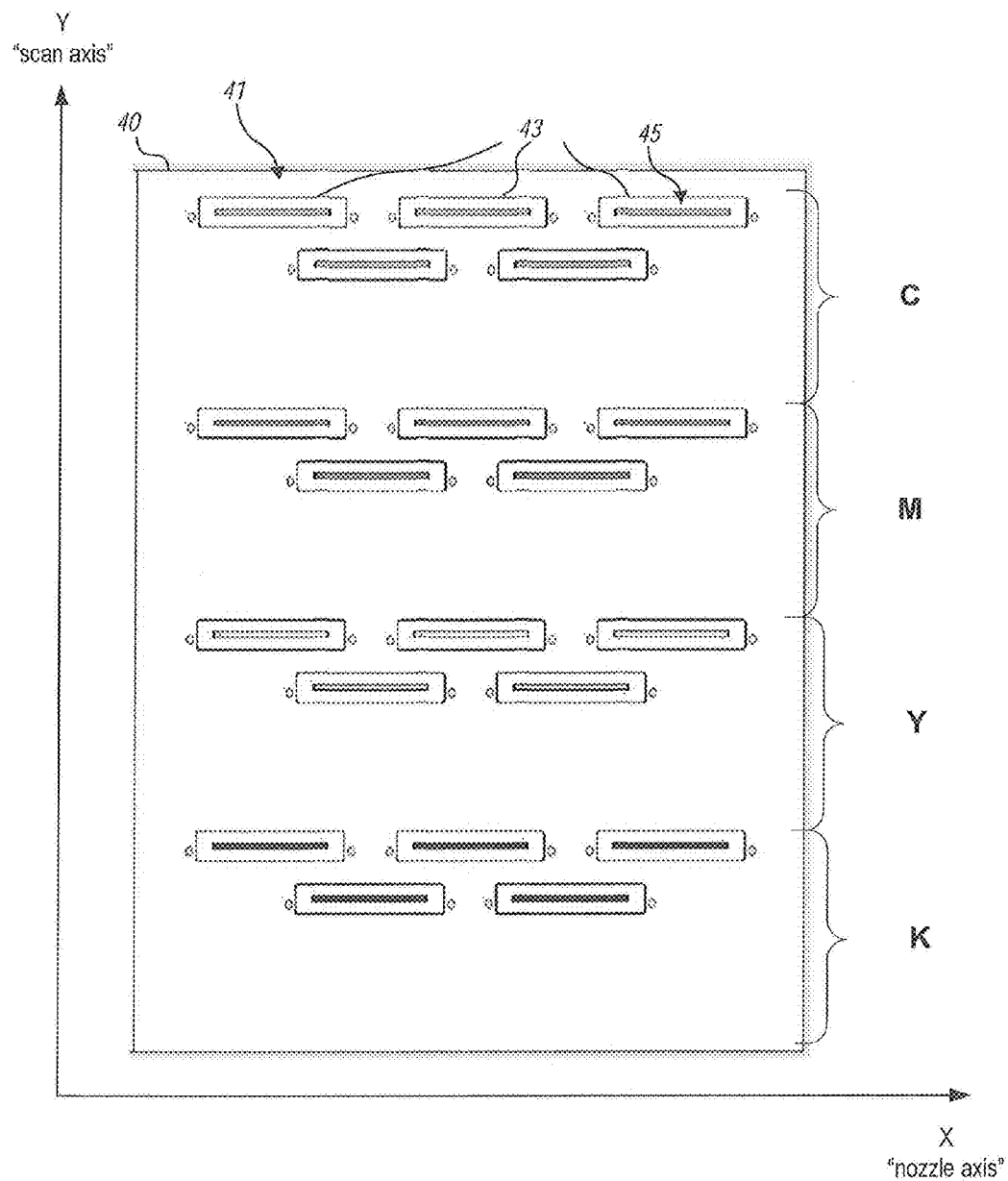
FIG. 3

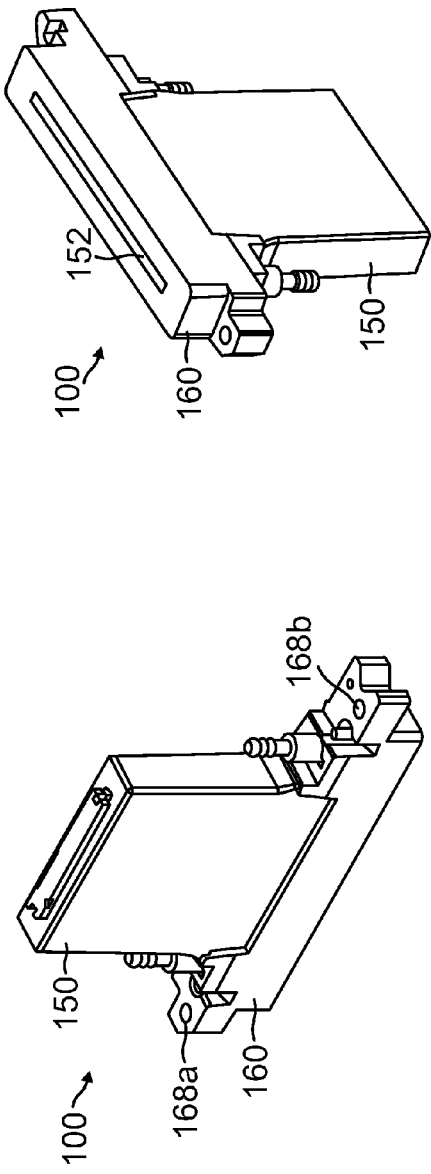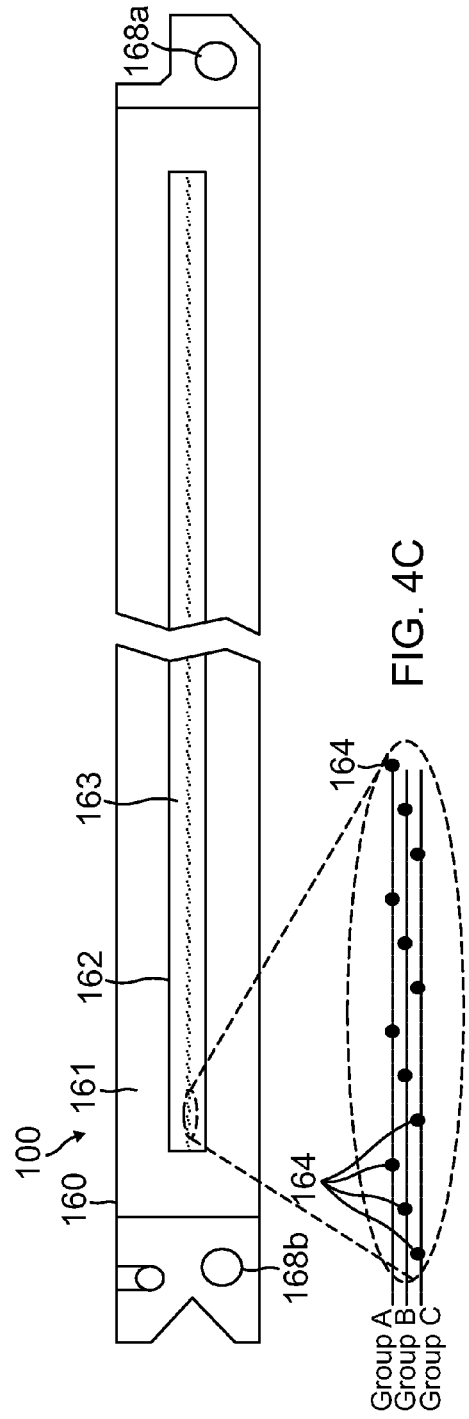

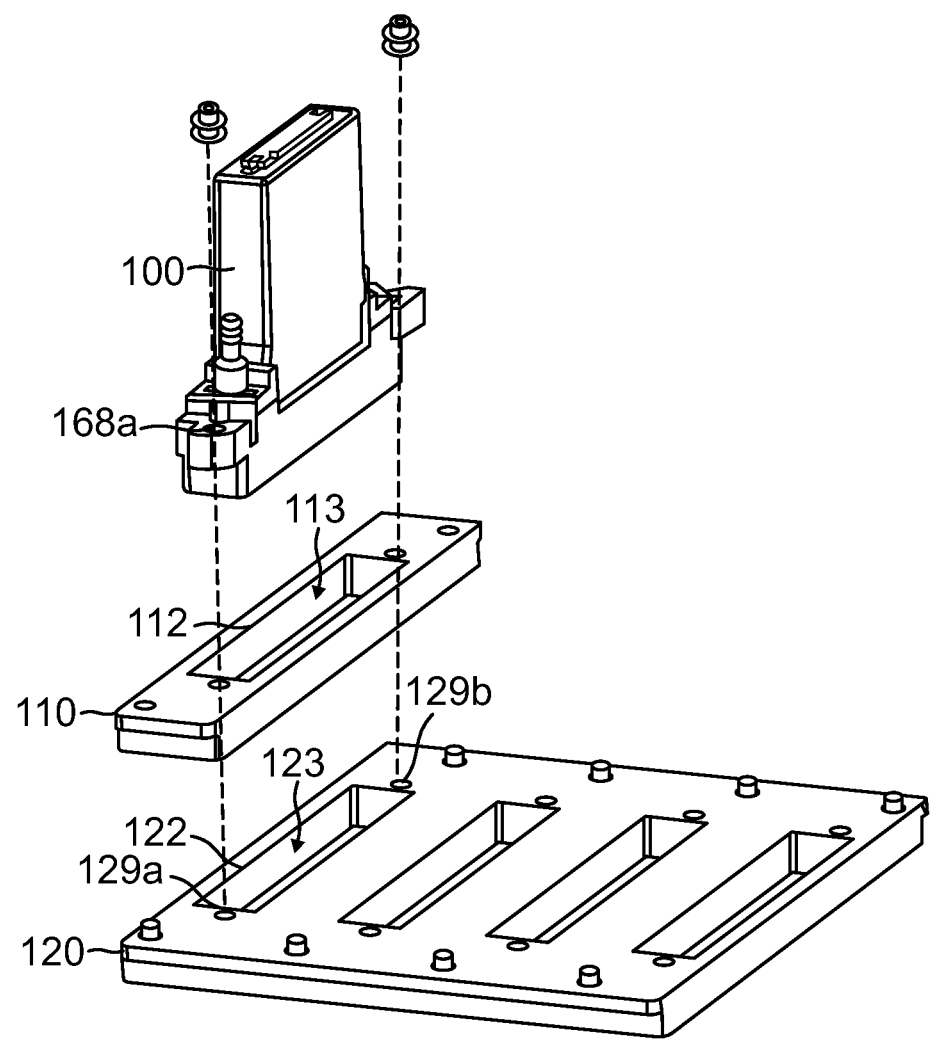
FIG. 5

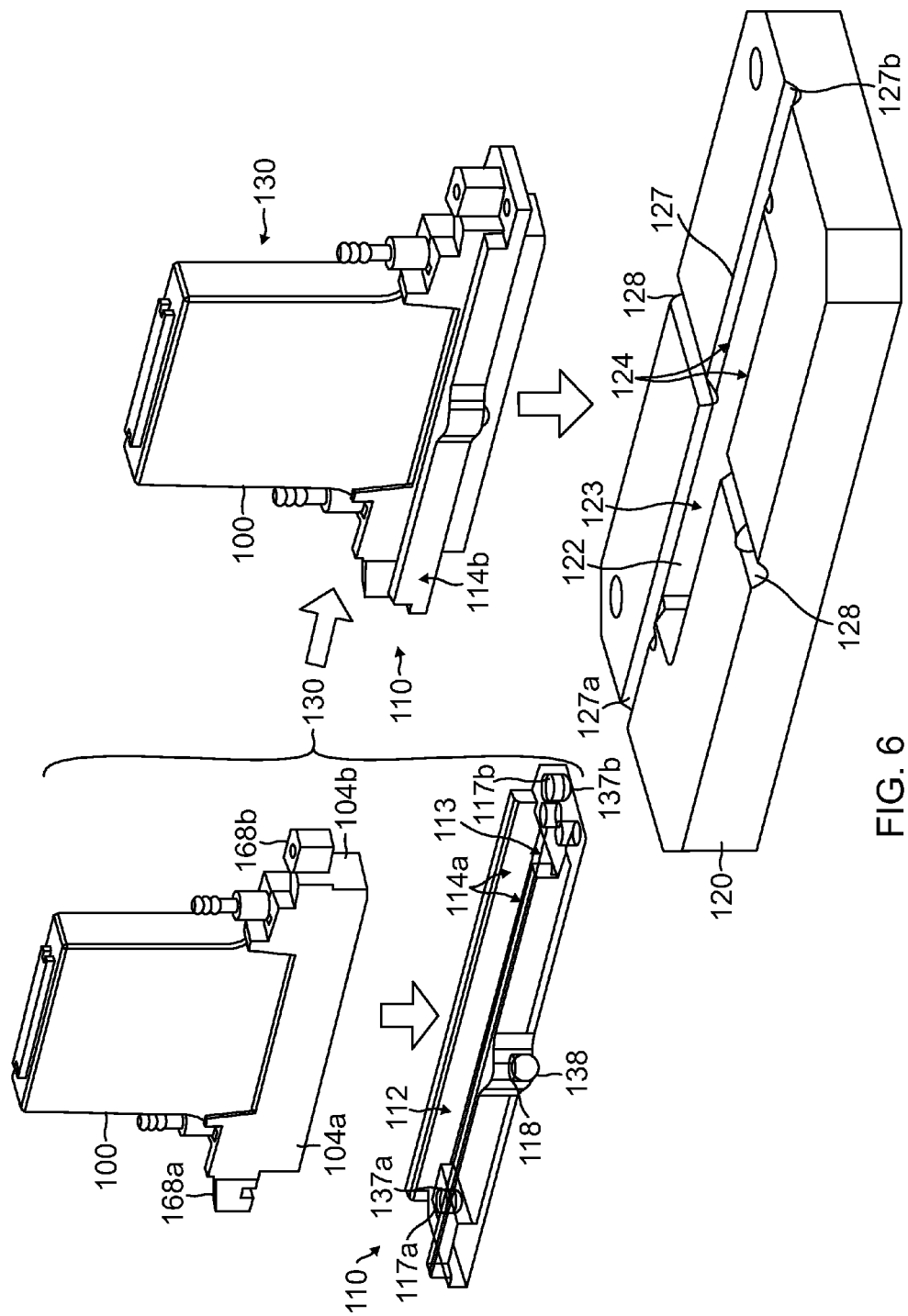
FIG. 6

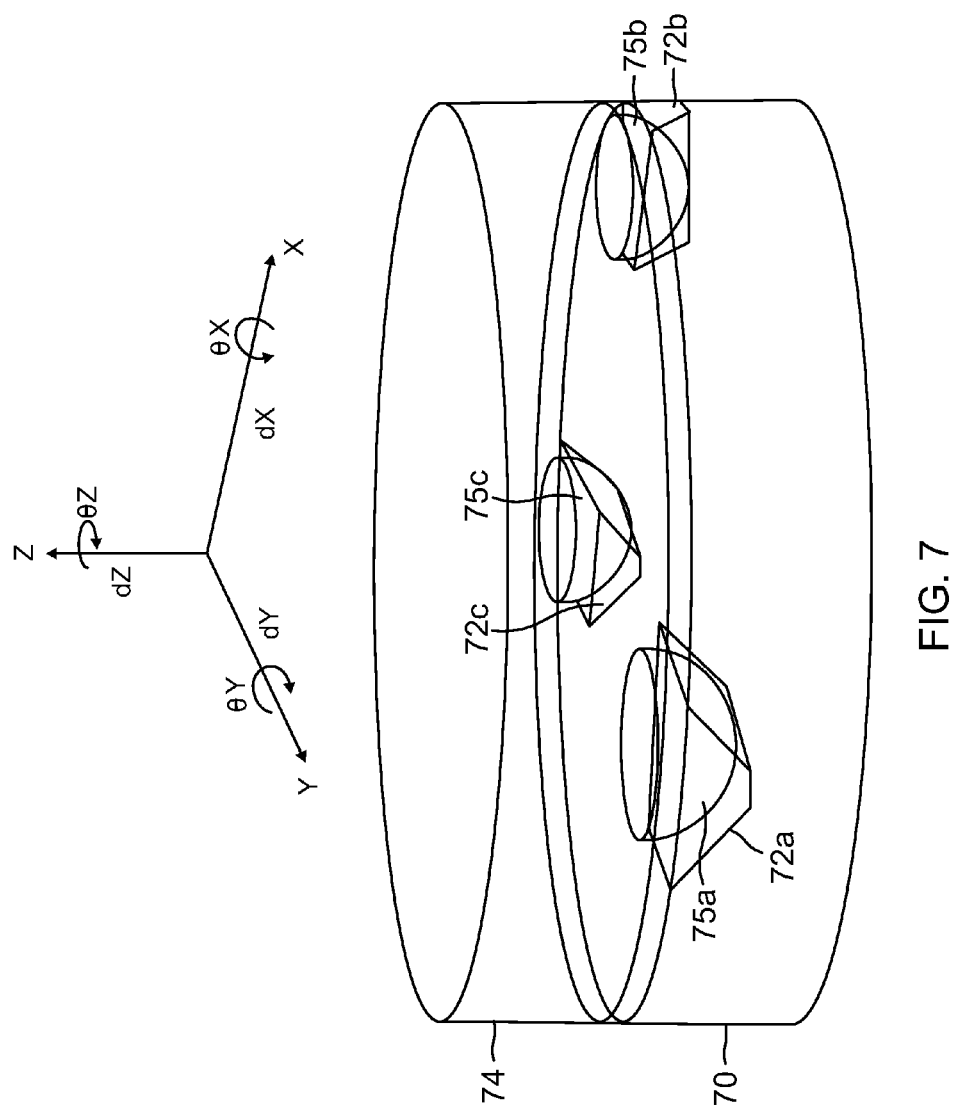
FIG. 7

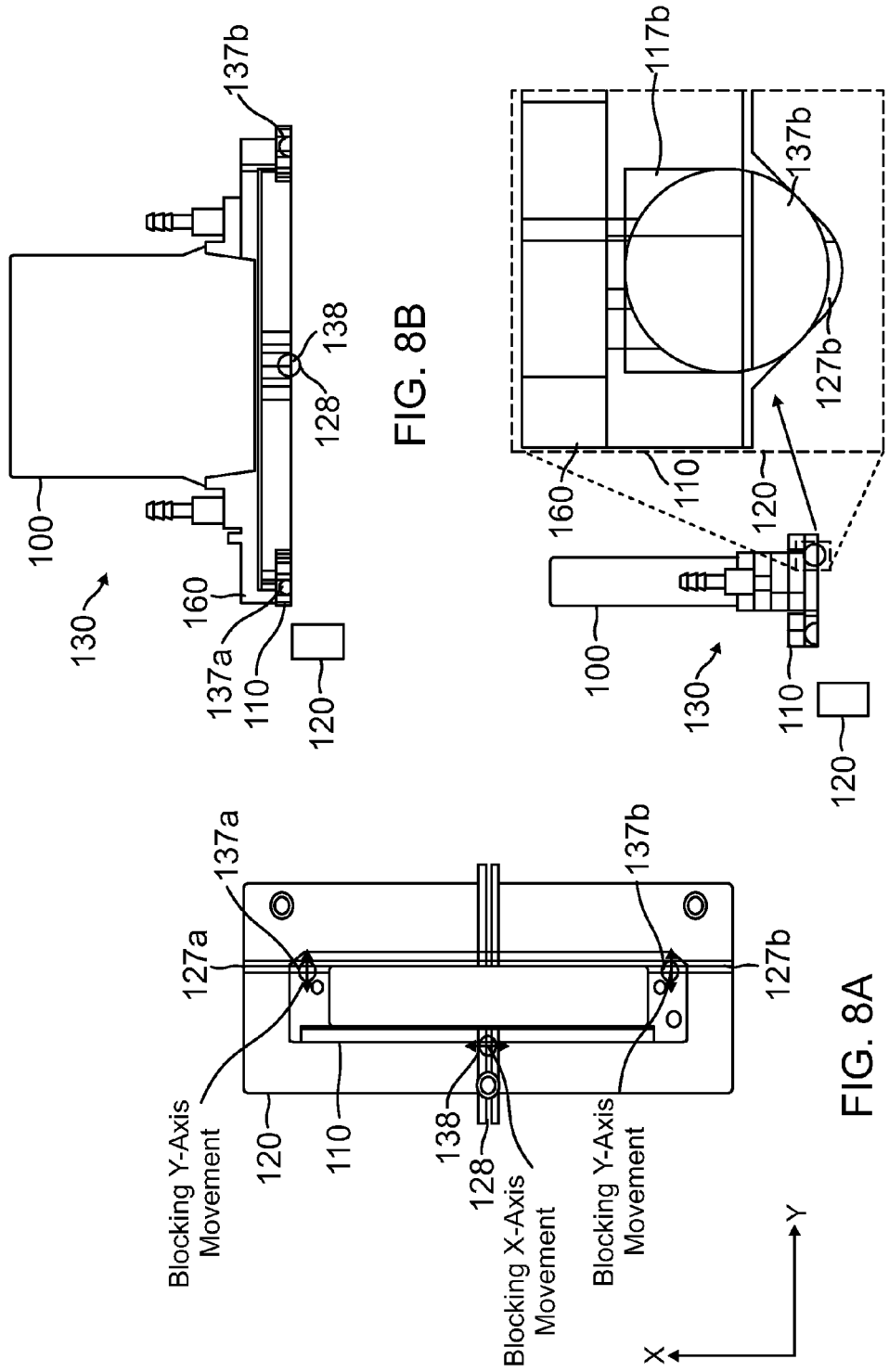

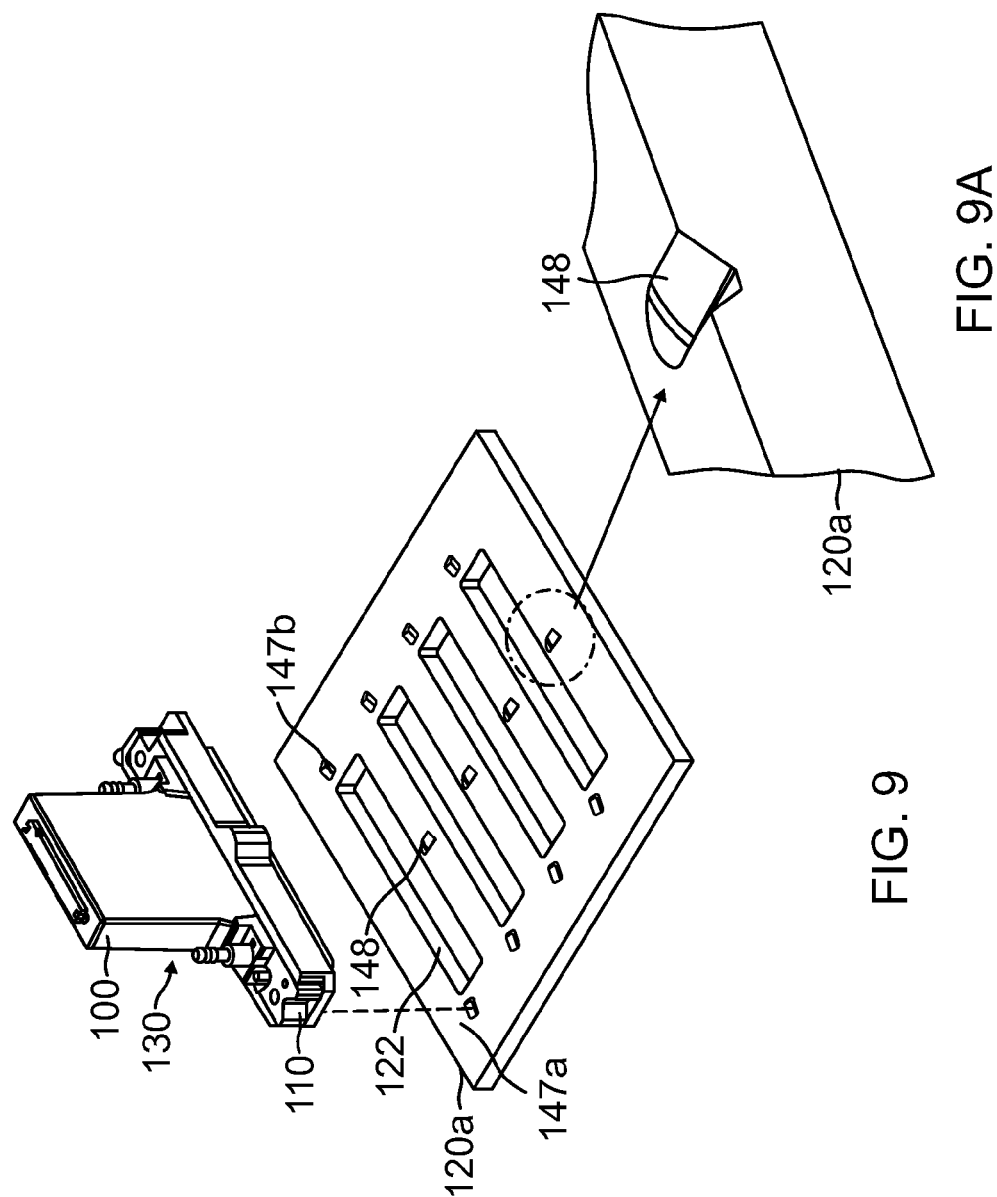

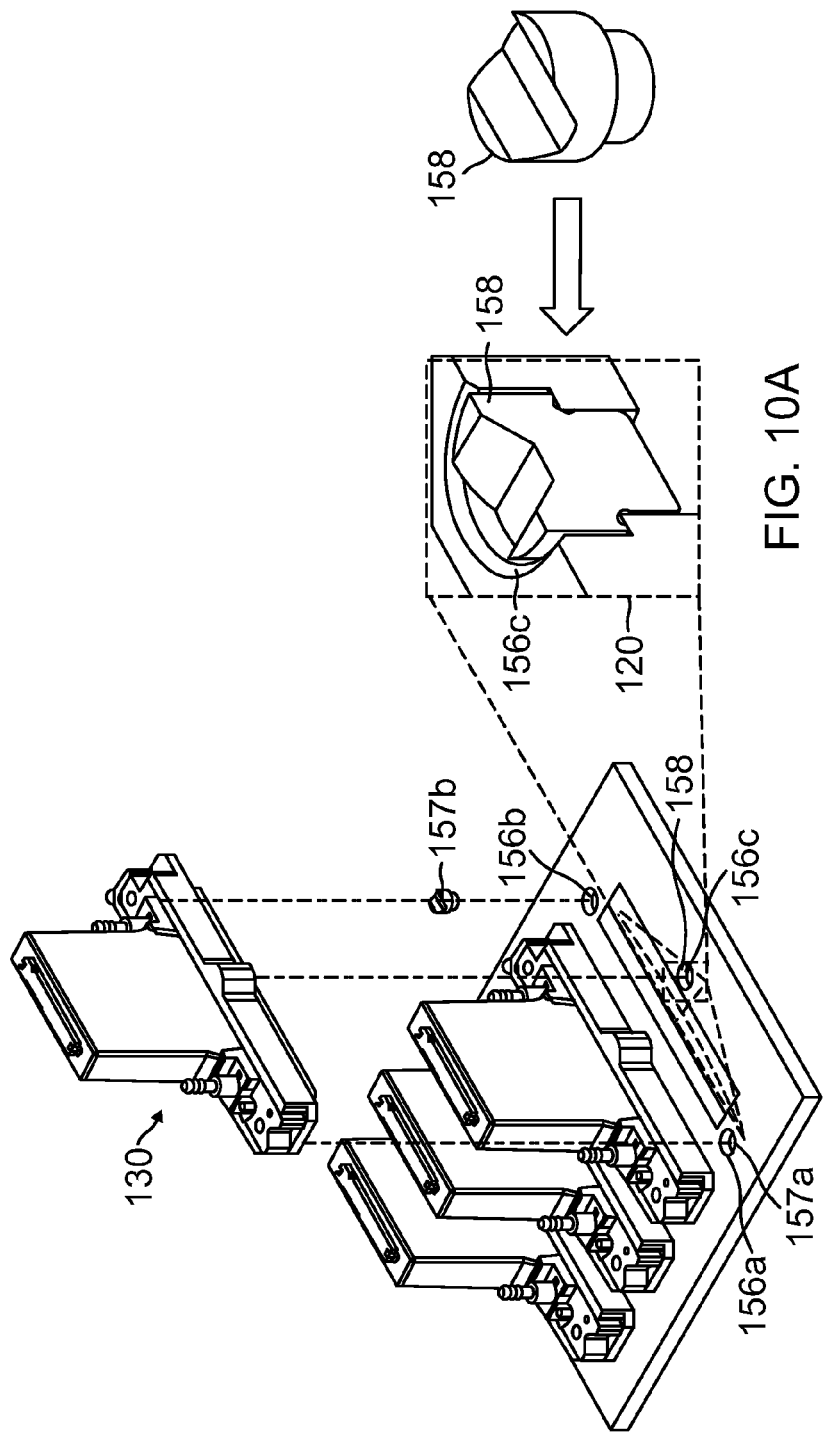

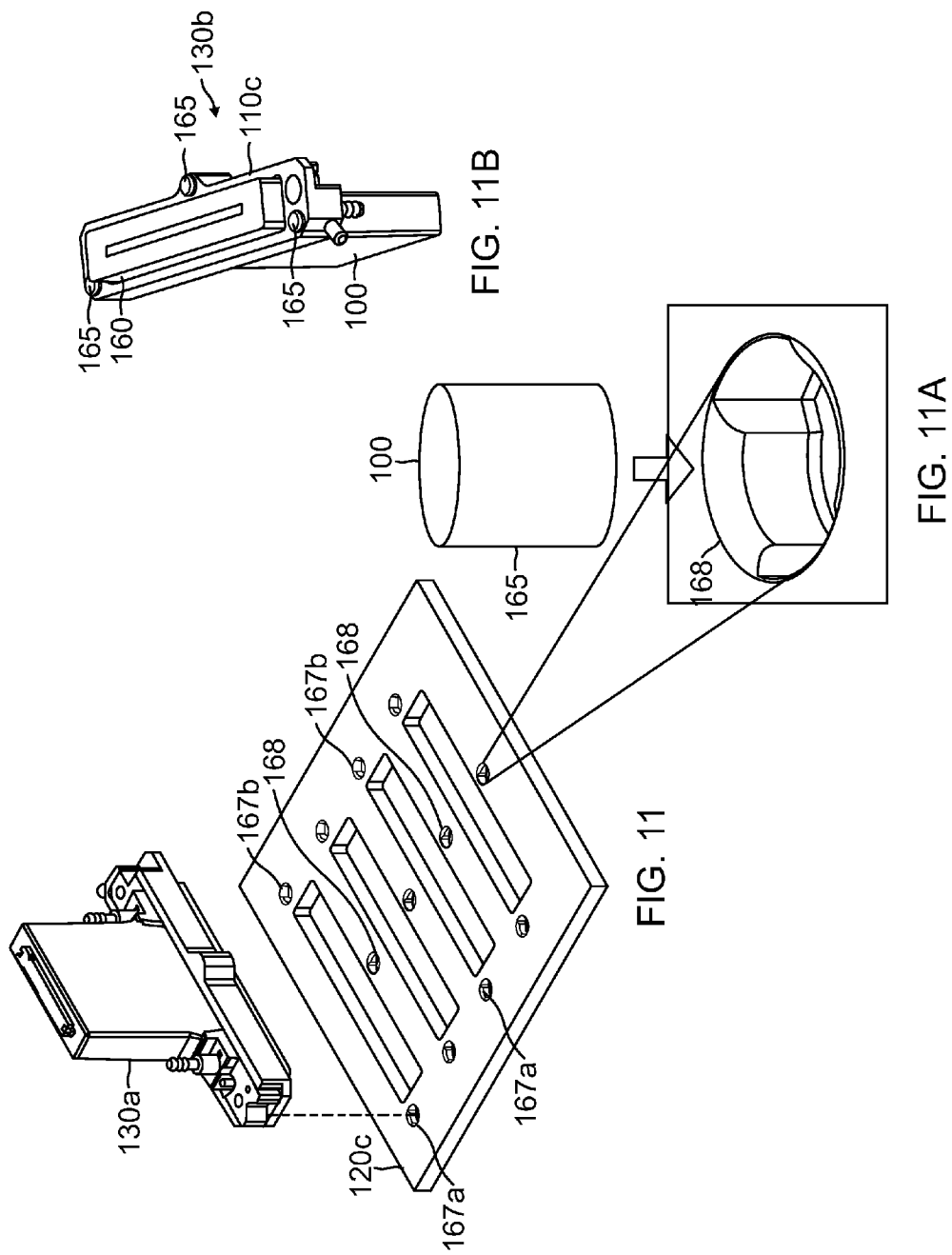

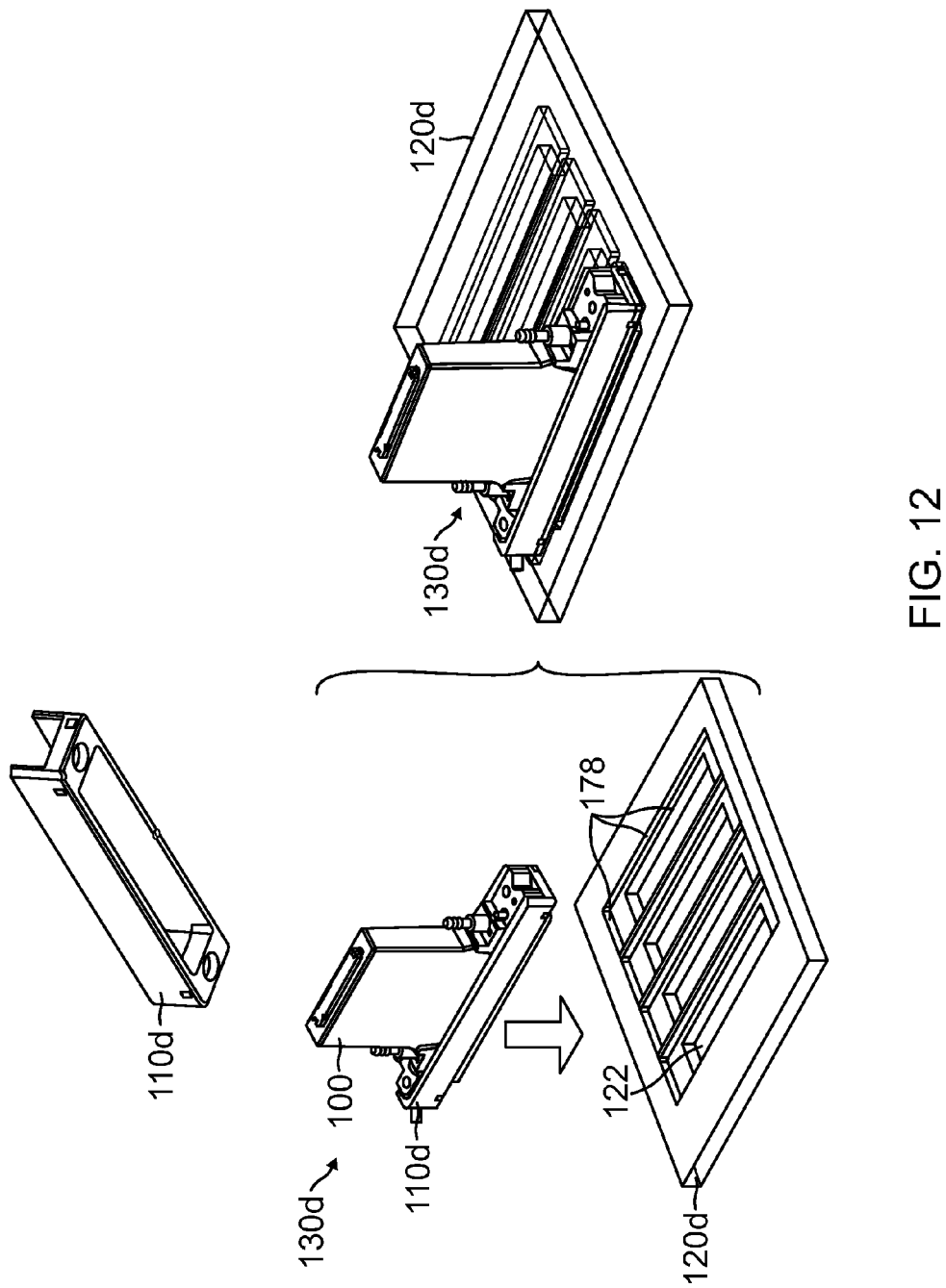
FIG. 12

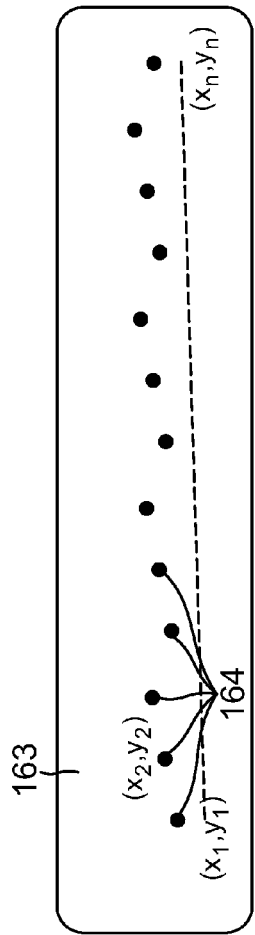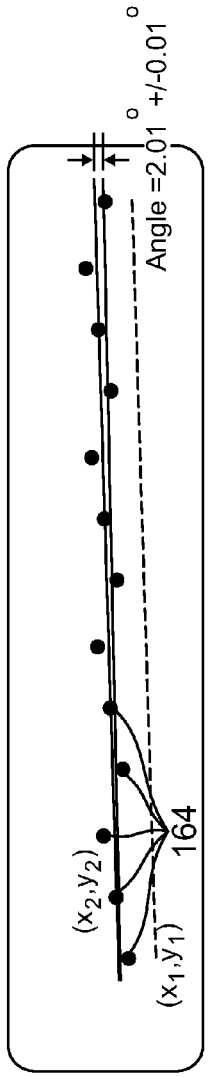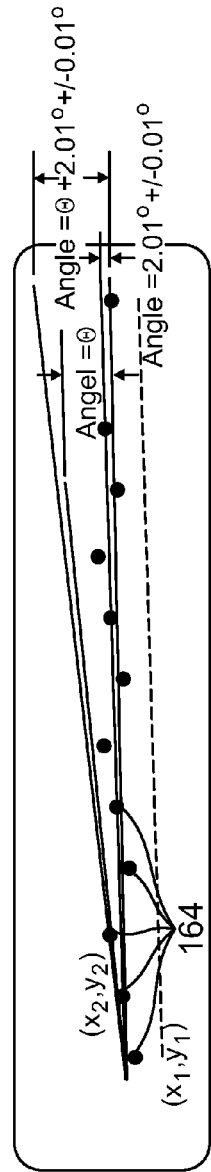
FIG. 13A  FIG. 13B  FIG. 13C

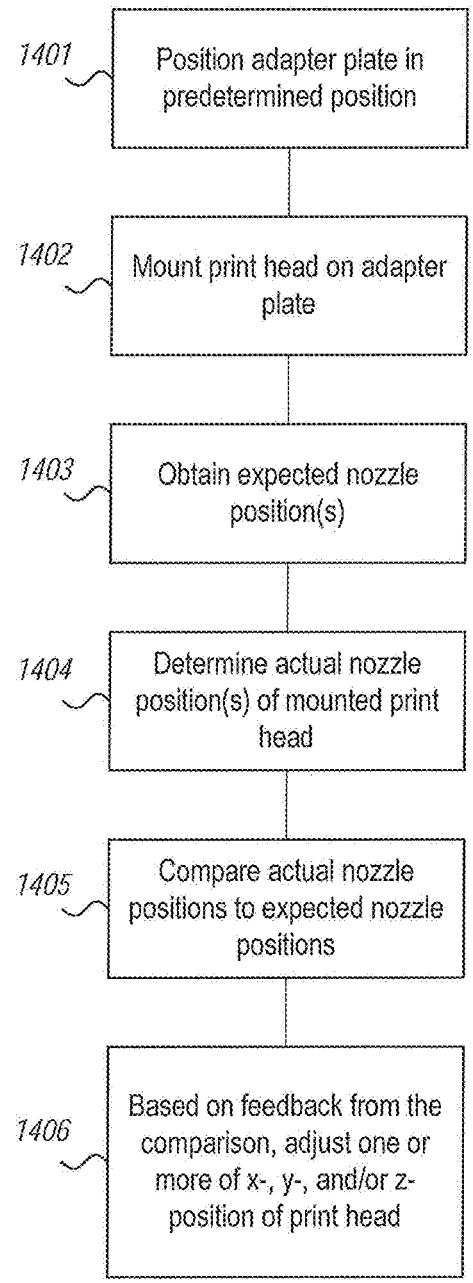
FIG. 14

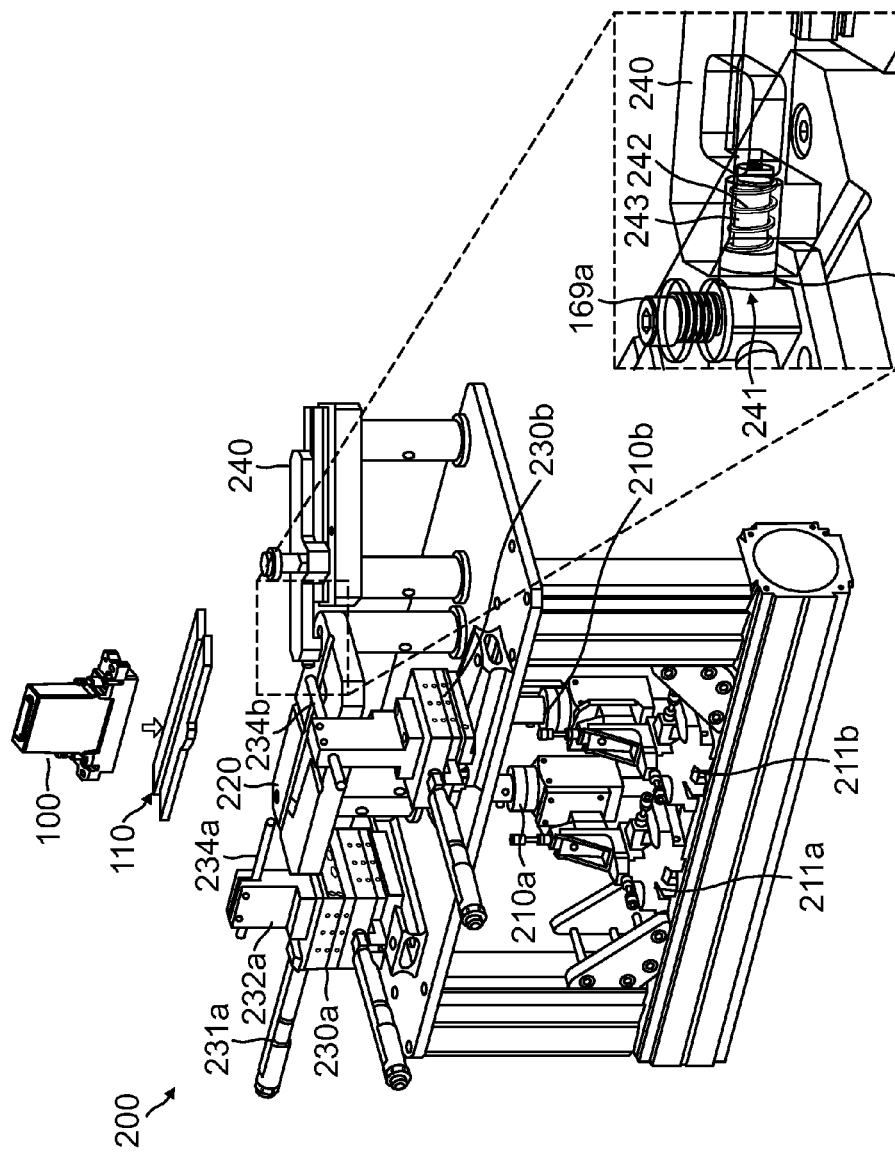

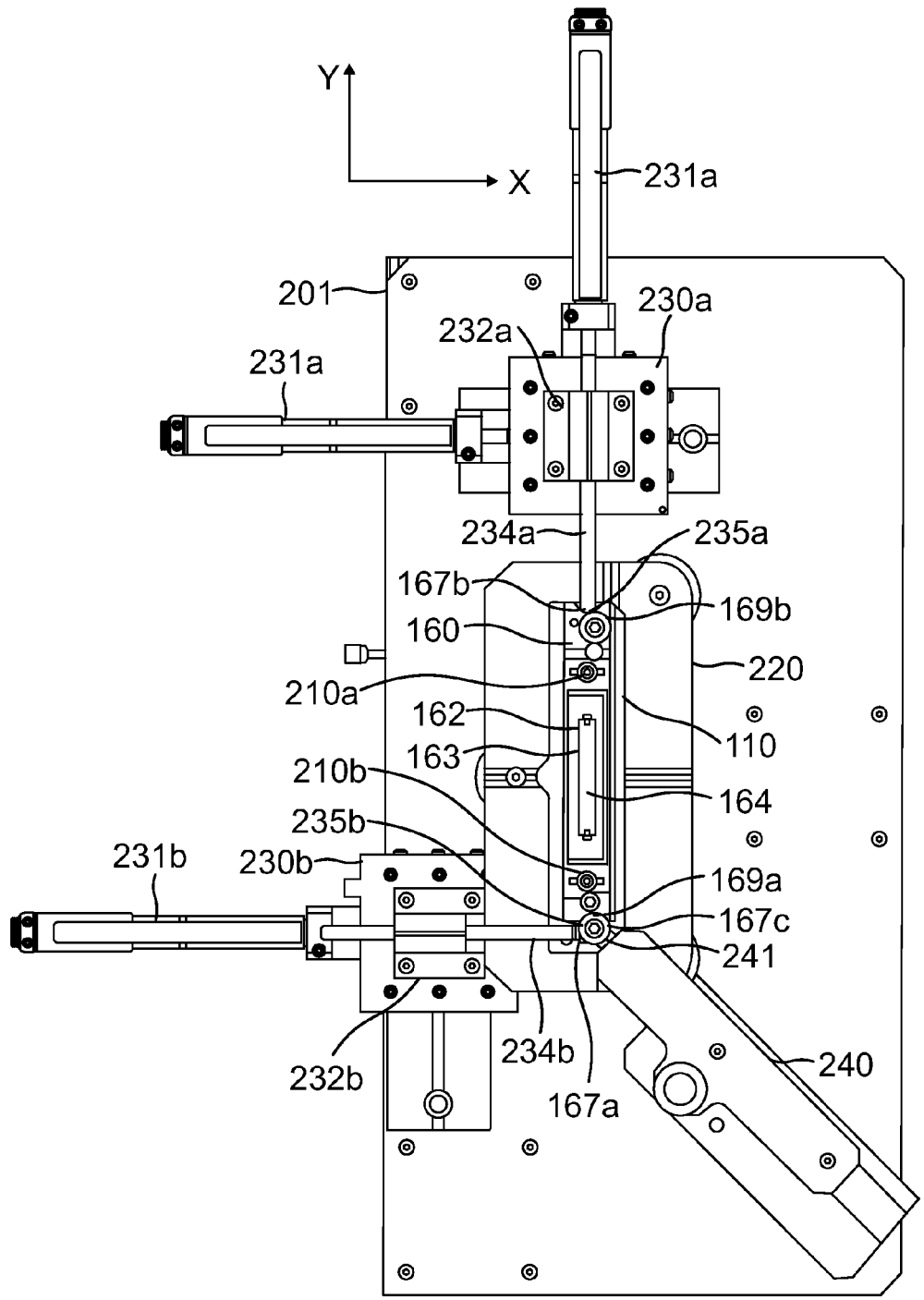
FIG. 16

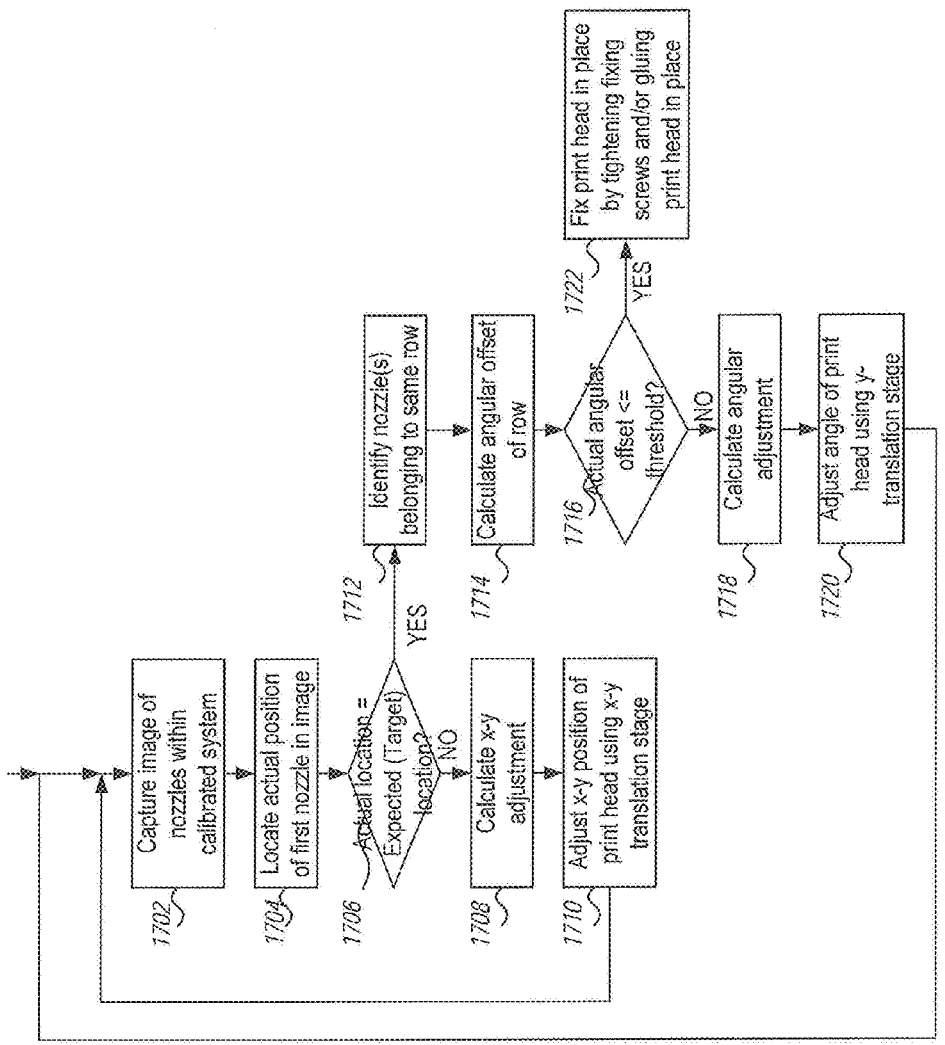
FIG. 17

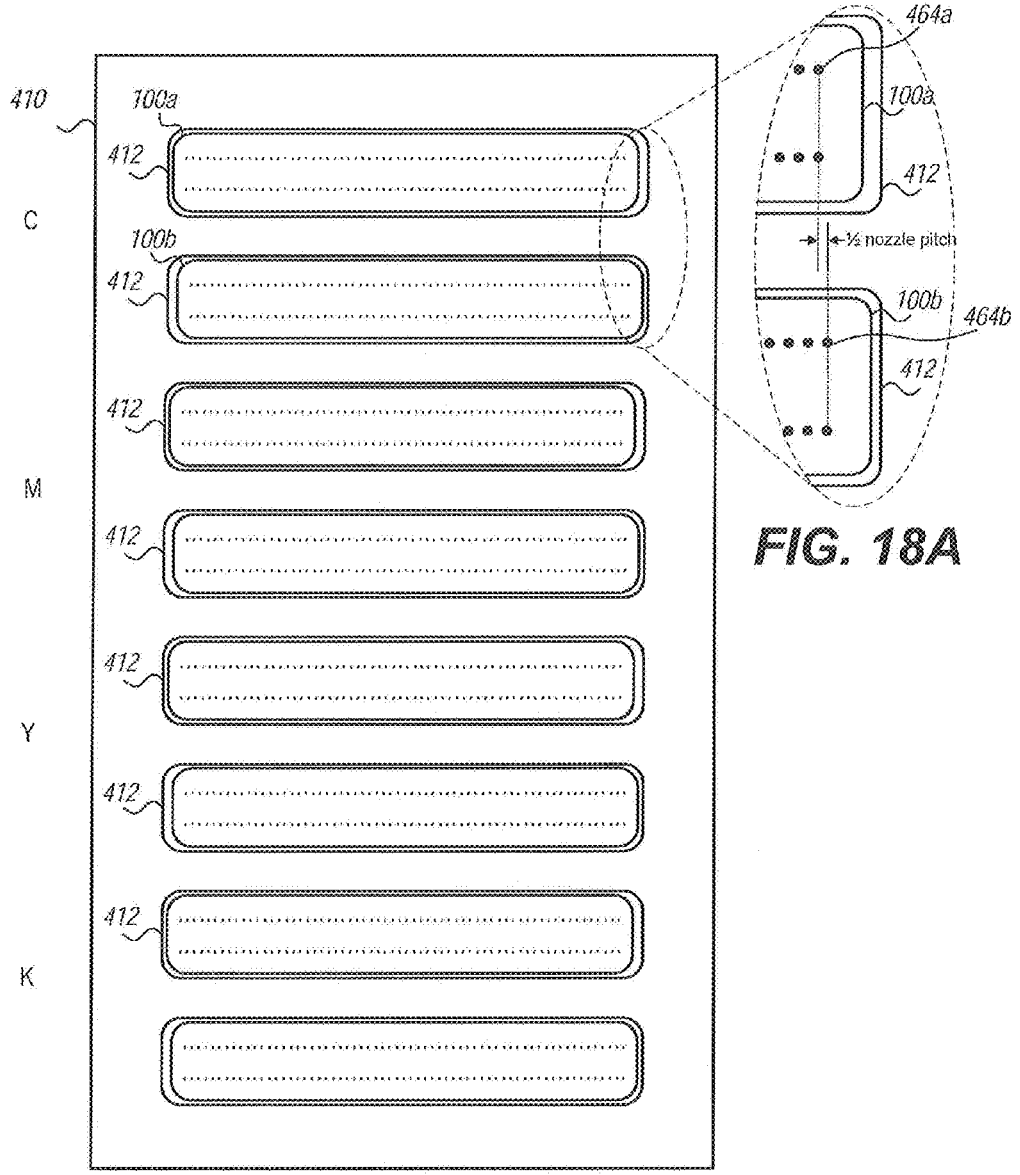
FIG. 18A
FIG. 18

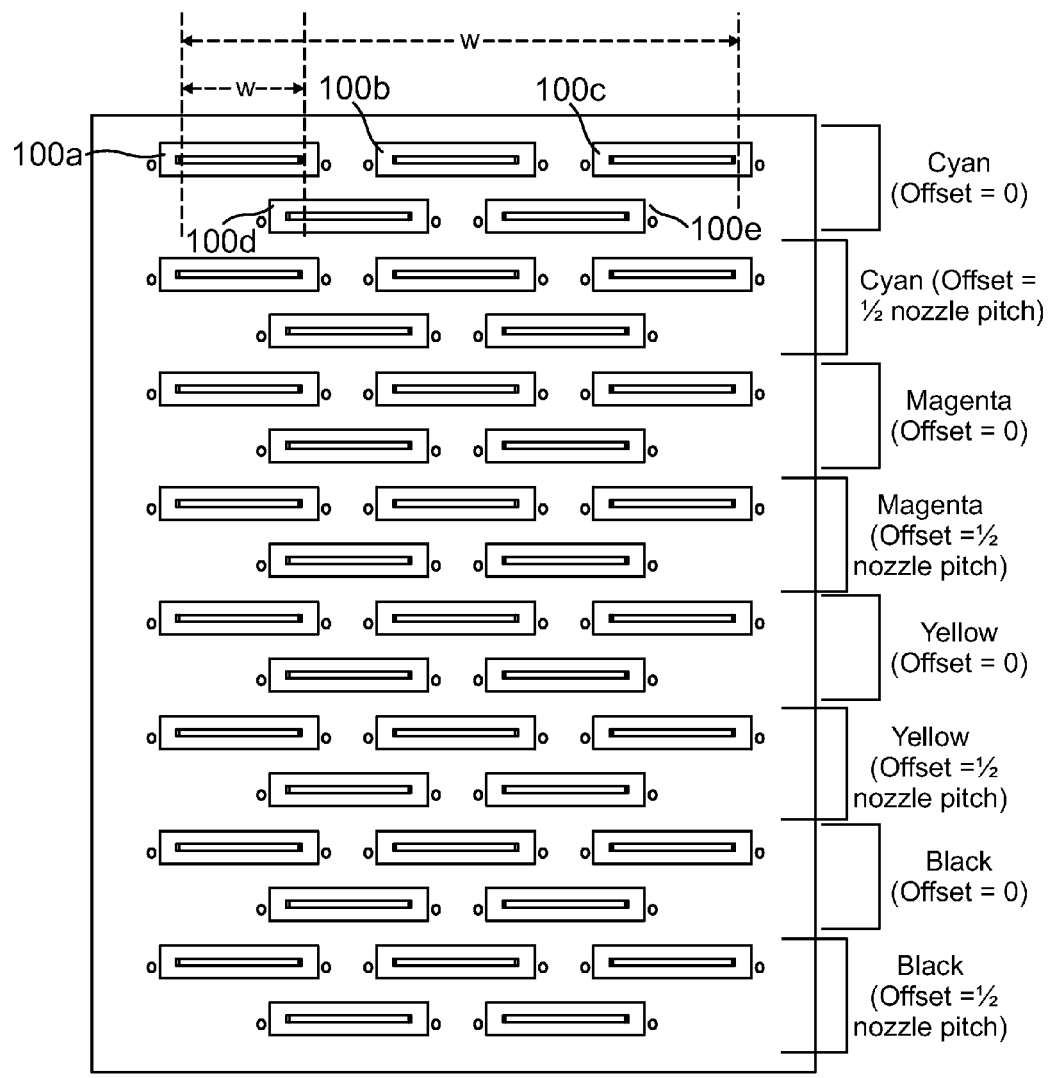
FIG. 19

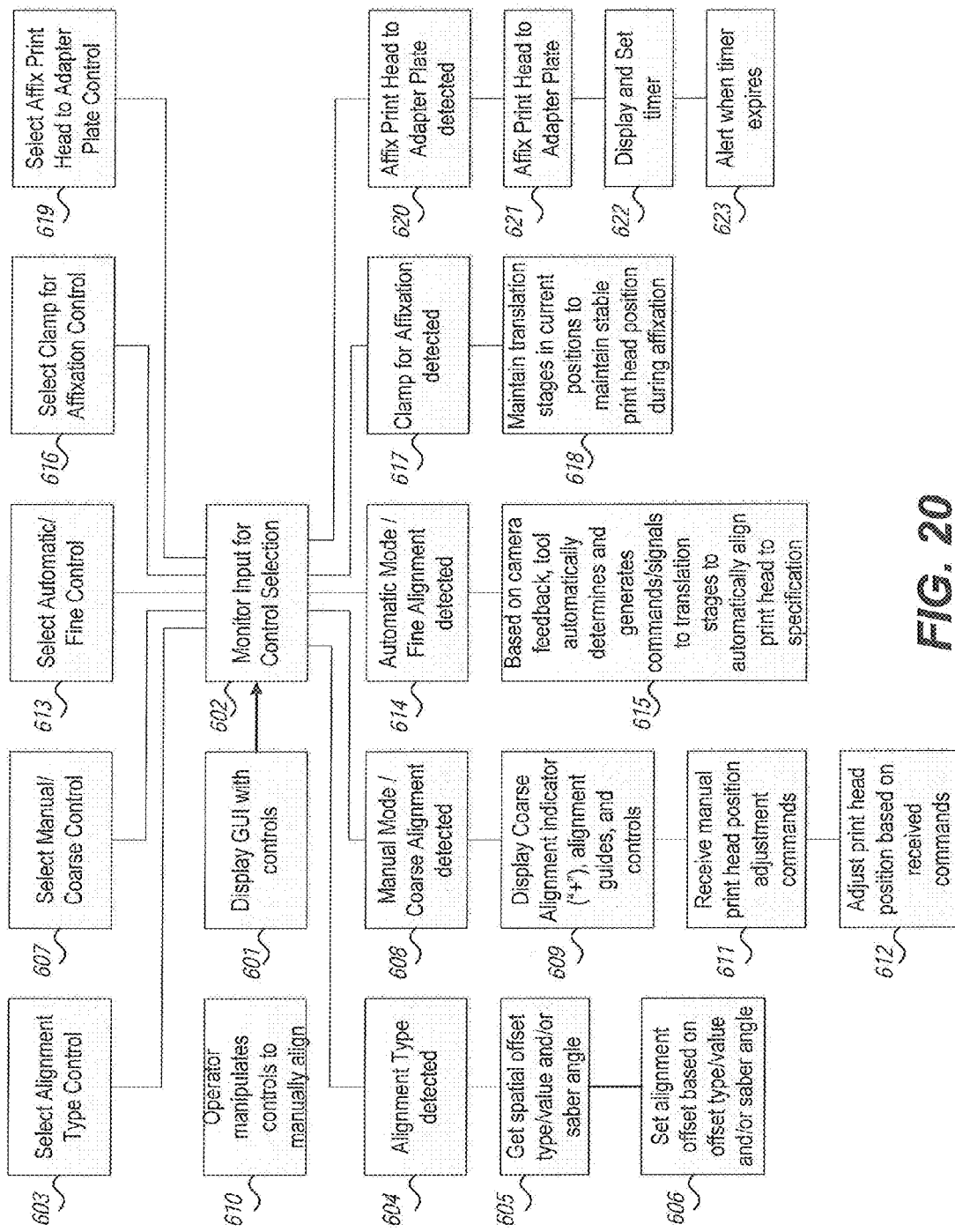
FIG. 20

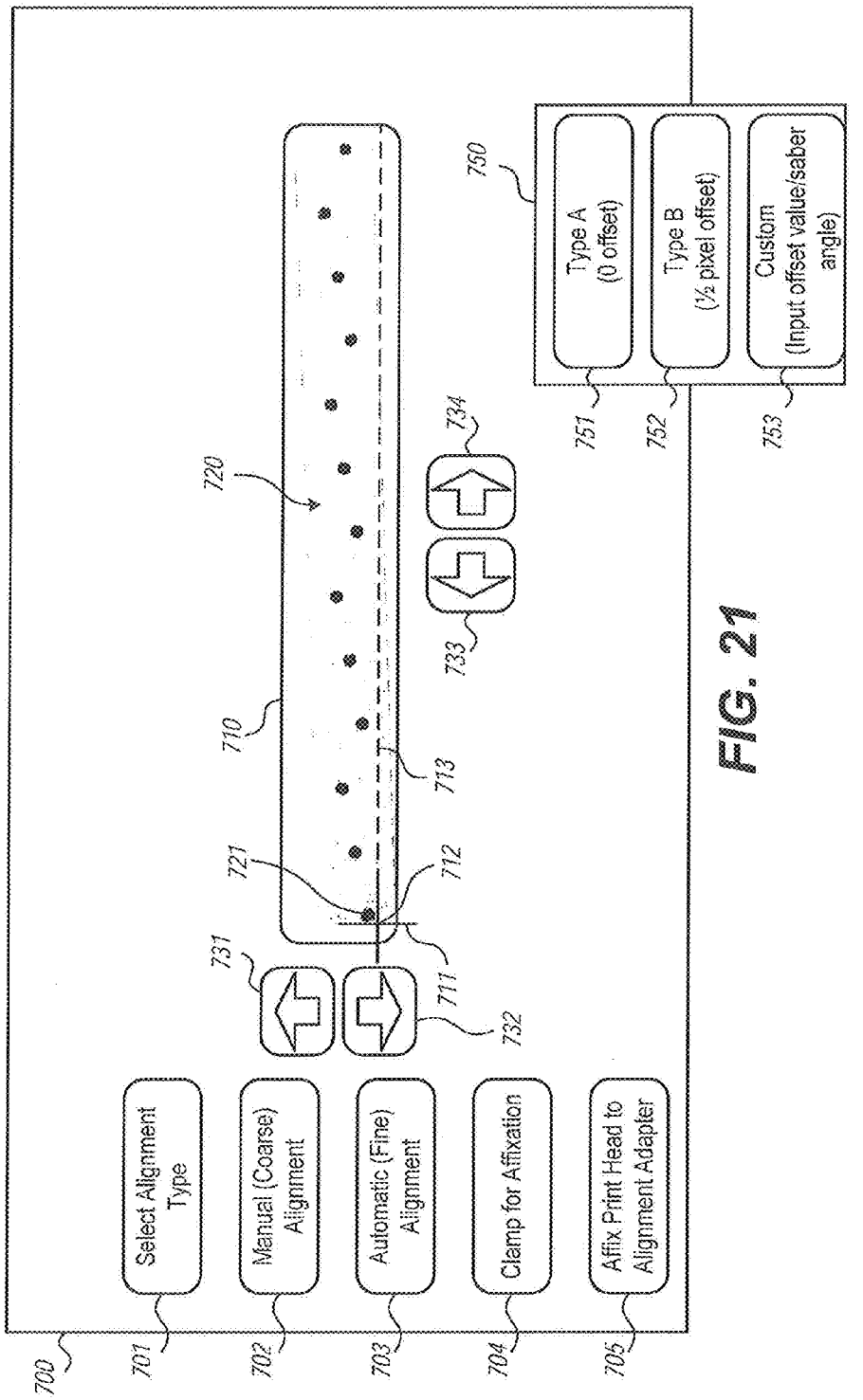

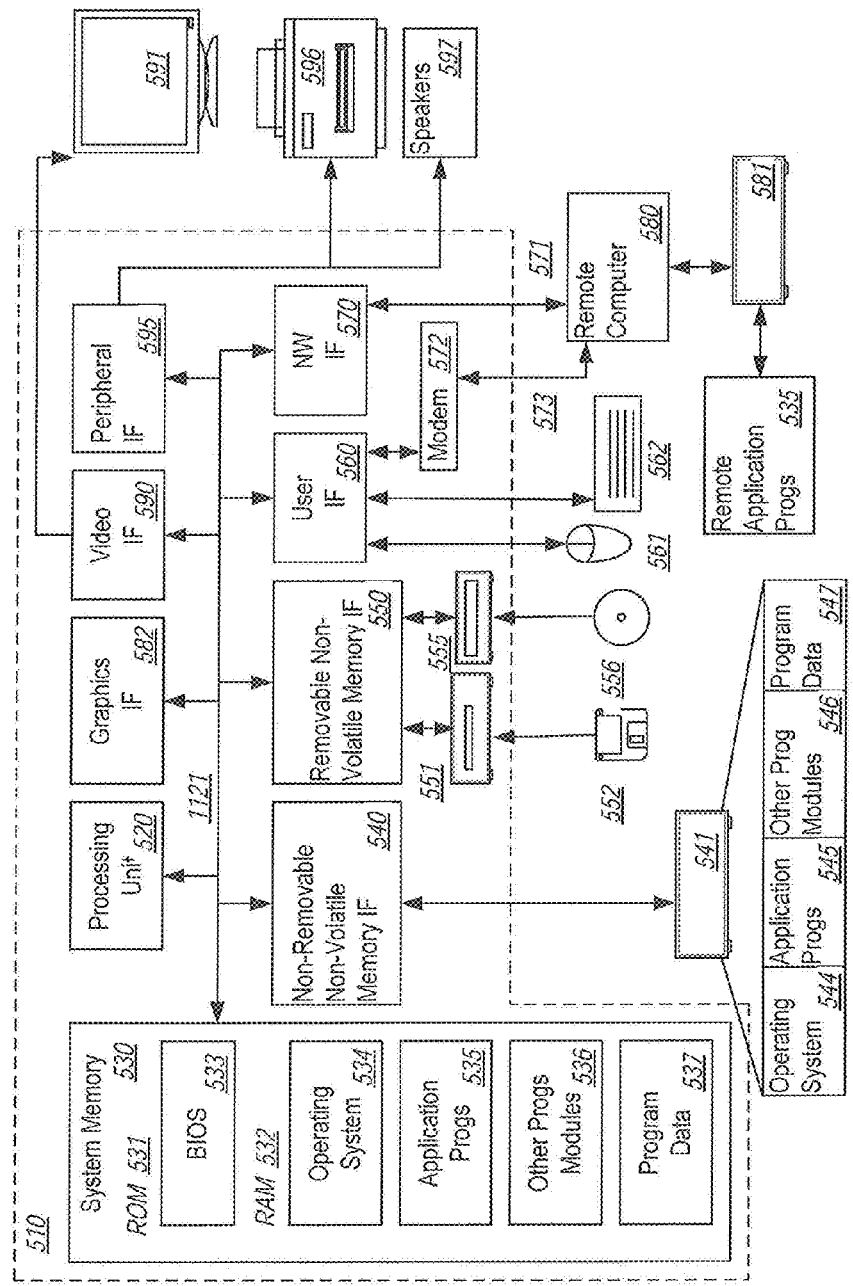
FIG. 22

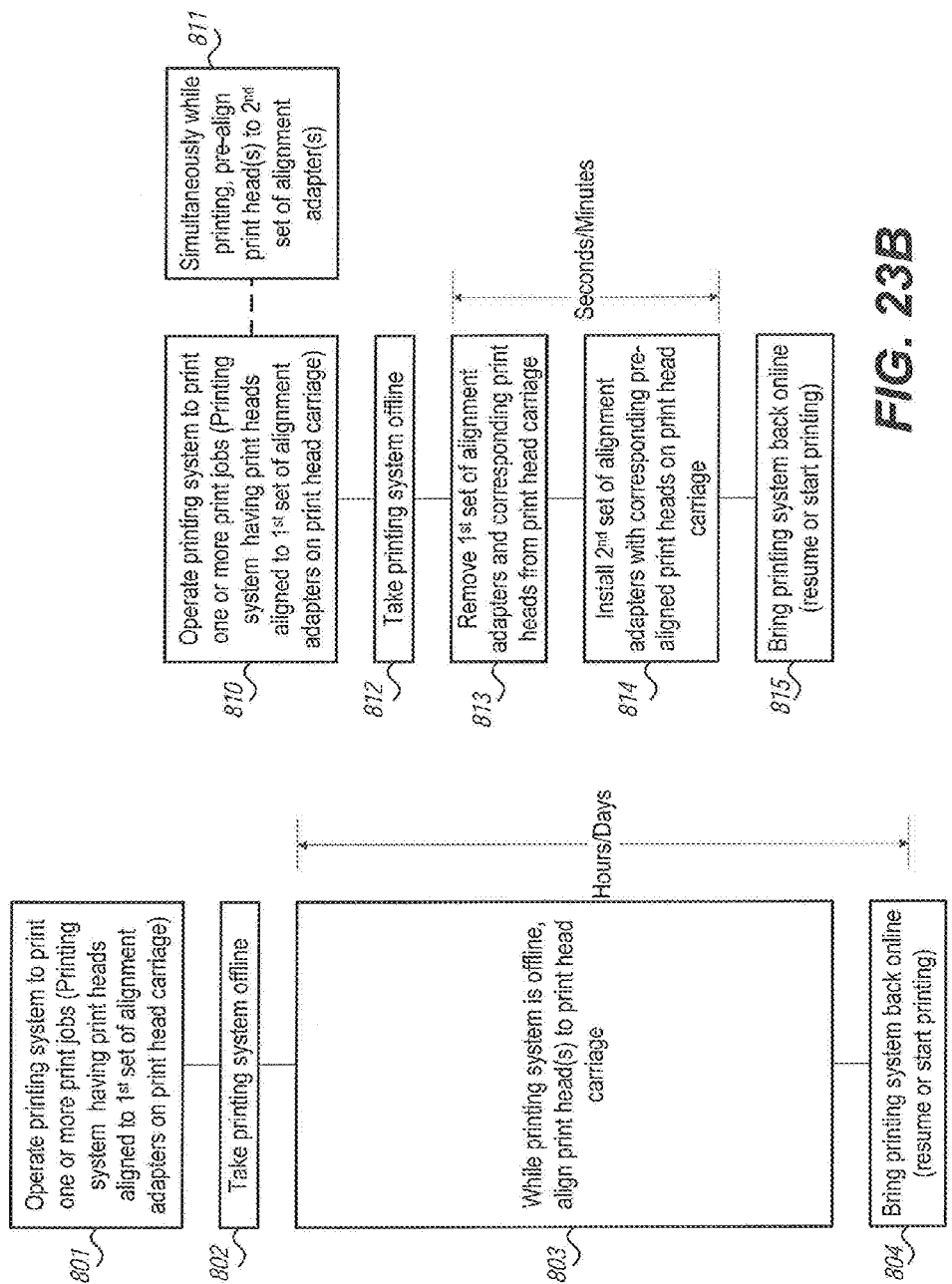
*FIG. 23B*
*Prior Art*
*FIG. 23A*

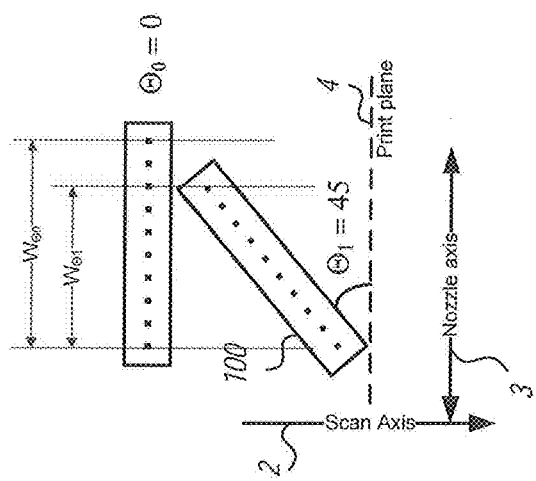
FIG. 24B
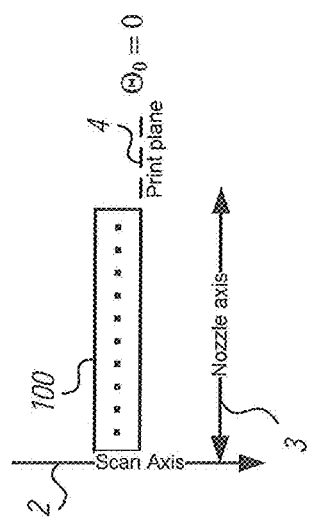
FIG. 24A

PRINT HEAD PRE-ALIGNMENT SYSTEMS AND METHODS

CROSS-REFERENCE TO RELATED APPLICATIONS

The present application is related to U.S. patent application entitled "System And Method For Print Head Alignment Using Alignment Adapter", to Moreau et al., and having U.S. application Ser. No. 13/719,854, filed concurrently herewith on Dec. 19, 2012, and U.S. patent application entitled "System And Method For Offline Print Head Alignment", to Viet-Ngo et al., and having U.S. application Ser. No. 13/719,905, filed concurrently herewith on Dec. 19, 2012, and U.S. patent application entitled "Print Head Alignment Systems And Methods For Increasing Print Resolution", to Moreau et al., and having U.S. application Ser. No. 13/719,990, filed concurrently herewith on Dec. 19, 2012, each of which is incorporated herein by reference in its entirety.

BACKGROUND OF THE INVENTION

The present invention relates generally to digital printing technology, and more particularly to techniques for aligning print heads on a print head carriage of a printer.

Printing technologies have advanced dramatically over the last few decades. For many years, the standard technology for printing large quantities of the same prints has been the domain of offset printing. Offset printing involves the transfer of an inked image from a plate to a rubber blanket, then to the printing surface. In large industrial offset presses, the plates and rubber blankets are wrapped around rollers which allows for high-speed production of thousands of copies of a printed image. Offset printing presses embody direct contact printing in that the components of the press (for example, the rubber blanket) directly contact the paper on which the image is printed.

In the background of the industrial realm, inkjet printing began to take hold as an inexpensive digital printing technology used mainly in the home and small office domains. Inkjet printing technology operates by ejecting miniscule ink droplets from nozzles of a print head device directly onto the surface of a printing substrate without the device coming into contact with the printed surface. Inkjet has the significant advantage that it does not require physical plates to be created for every image to be printed, nor for direct contact components, such as the rubber blanket, which requires ongoing maintenance. Inkjet printing therefore can be far more economical when printing a single or few copies of a particular print. However, in its early days, inkjet printing was typically much slower than offset printing due to limitations of the hardware. Furthermore, because inkjet printing prints a digital image, limitations on the obtainable printed resolution often made offset printing or laser printing the better choices over inkjet for applications requiring very high quality printing.

More recently, inkjet printing technologies (and various related non-contact printing technologies) have advanced to the forefront of industrial digital printing. Improvements in print head technology and print head carriage configurations have allowed for increased print resolution, and additionally throughput has increased. The advantages offered by inkjet printers, including purely non-contact printing, which reduces wear and tear on printer components and makes for a much cleaner printing environment requiring less process maintenance, along with the elimination of the need to create physical plates for each image, makes inkjet not only a viable printing approach for industrial printing, but may even make inkjet printing the favored solution.

In general, inkjet printers utilize one of two methods for printing: multi-pass (or "multi-scan") printing and single-pass printing. In multi-pass printing, the print substrate (i.e., the object on which the image is to be printed) is advanced in a forward "feed" direction along a "feed axis", while a print head carriage carrying a number of print heads is reciprocated in a scanning direction along a scan axis that is perpendicular to the feed axis. The print head carriage traverses the print substrate in multiple passes back and forth along the scan axis as the print substrate advances along the feed axis.

In single-pass printing, the scan axis and the feed axis are the same, where the print head carriage remains in a fixed position while the print substrate is advanced past the print head nozzles in a single pass to complete the image. Alternatively, the print substrate remains in a fixed position while the print head carriage advances across the print substrate in a single pass to complete the image.

Regardless of whether the printer is configured for multi-pass printing or single-pass printing, the print head carriage in an industrial inkjet printer will typically carry many individual print heads. For example, as will be described in more detail hereinafter, a print head carriage may carry dozens of print heads simultaneously. Each print head mounted on the print head carriage contains a plurality of individual nozzles through which ink is ejected during the printing process. For any given print head, the print head nozzles are precision-aligned in linear rows by the manufacturer to be within a specified distance plus/minus a specified tolerance with respect to each other. However, with respect to the edges of the print head package (e.g., the housing, cover, and mounting plate), the nozzles are not necessarily as accurately aligned. Furthermore, when a print head is mounted onto a print head carriage, its seating on the carriage may skew the alignment of the nozzles with respect to the carriage and/or with respect to the nozzles of other print heads seated on the carriage.

Precise alignment of the print heads on the print head carriage is required for printing accuracy and quality. As a result, the alignment of the print heads must be checked and adjusted prior to using the print head carriage for printing. On a print head carriage which carries multiple print heads, the alignment of the nozzles must also be performed so that nozzles across different print heads also align to each other. On a print head carriage which carries many print heads, this can take a significant amount of time. In addition, since the nozzle pitch on a print head is typically on the order of tens of microns, the print head alignment process can be quite tedious and time-consuming even for the skilled technician.

Due to repeated use of the print heads by the printer, the print heads can wear out or clog over time, and therefore individual print heads on the carriage need to be replaced intermittently. After replacement of a print head, the replacement print head needs to be aligned on the carriage to ensure accurate alignment of its nozzles relative to the nozzles of the other print heads on the carriage. Print head replacement requires removal of the print head carriage and traditionally involves the iterative process of printing of test patterns on paper, measuring the alignment of the printed dots on the paper, and adjusting the alignment of the print head. This process can take hours or even up to days of a technician's time to replace and align or re-align the print heads on the carriage. Unless another print head carriage is available and ready to go with previously-aligned print heads, the printer becomes unavailable for use during the duration of the replacement and alignment process. In a production environment, this may be unacceptable.

It would therefore be desirable to have better processes and systems for aligning print heads on a print head carriage.

SUMMARY OF THE INVENTION

To solve the problems indicated above, various methods, systems, and tools which generally make use of an intermediary alignment adapter placed between the print head and print head carriage mounting plate of the print head carriage can facilitate efficiency in print head alignment, shorter printing system downtime due to print head alignment, and higher print resolution achievable for printed matter.

In an embodiment, a method for aligning a print head to a print head carriage of a printing system includes the step of pre-aligning a print head to align nozzles of the print head to a known position relative to one or more features of an alignment adapter. The alignment adapter is configured with an aperture through which the nozzles of the print head are exposed, the alignment adapter having precision mounting features. The method further includes the step of engaging the precision mounting features of the alignment adapter with cooperating precision mounting features of the print head carriage to align the alignment adapter in a predetermined position relative the print head carriage.

In another embodiment, a printing system is configured with a print head carriage which carries at least one print head, an alignment adapter configured to hold the at least one print head, the alignment adapter having at least one aperture through which respective nozzles of the respective at least one print heads are exposed and aligned to one or more features of the alignment adapter, the alignment adapter having precision mounting features configured to engage corresponding cooperating precision mounting features of the print head carriage such that the alignment adapter is aligned in a predetermined position relative the print head carriage, and a printing apparatus configured to receive a print substrate on which an image is to be printed and which controls relative movement between the print head carriage and the print substrate and to effect printing of the image onto the substrate.

In a further embodiment, a method operates to maximize print production efficiency. The method includes printing one or more print jobs using a printing system, wherein the printing system comprises a print head carriage which carries a first set of one or more print heads, a first set of one or more alignment adapters configured to hold the one or more print heads and having a corresponding aperture through which respective nozzles of the respective print heads are exposed, the first set of alignment adapters having precision mounting features configured to engage corresponding cooperating precision mounting features of the print head carriage and which are configured to align the alignment adapter in a predetermined position relative the print head carriage, and further wherein the printing system comprises a printing apparatus configured to receive a print substrate on which an image is to be printed and which controls relative movement between the print head carriage and the print substrate to effect printing of the image onto the substrate. The method further includes the step of during printing of the one or more print jobs using the printing system, pre-aligning one or more print heads to a second set of one or more alignment adapters, the second set of alignment adapters having corresponding one or more apertures through which respective nozzles of the respective print heads are exposed, the second set of alignment adapters having first precision mounting features configured to engage corresponding cooperating second precision mounting features of the print head carriage, the first precision mounting features and the second precision mounting features configured to ensure precise alignment of the second set of alignment adapters in corresponding predetermined positions relative to the print head carriage. The method further includes the steps of halting printing production by the printing system, removing the first set of print heads and corresponding first set of alignment adapters from the print head carriage, and engaging the precision mounting features of the second set of alignment adapters with corresponding cooperating precision mounting features of the print head carriage to align the second set of alignment adapters with pre-aligned print heads mounted thereon to the print head carriage.

In still a further embodiment, a method for pre-aligning a print head to an alignment adapter operates to place a print head in a predetermined position on the alignment adapter, obtain an image of the print head nozzles relative to one or more features of the alignment adapter, locate a first nozzle in the image, locate a first row of nozzles in the image of the print head nozzles, adjust a position of the print head to align a first nozzle of the print head to a target position based on image feedback showing changes to the position of the first nozzle of the print head based on the positional adjustments, and adjust a rotational angle of the print head to align the first row of nozzles to a target angle based on image feedback showing changes to the position of the first nozzle of the print head based on the positional adjustments.

In still another embodiment, a system operates to pre-align a print head to an alignment adapter. The system includes a calibration system having a frame providing a Cartesian reference system, a simulation plate mounted on the frame at a predetermined pre-calibrated position within the calibration system. The simulation plate is configured with a simulation plate socket having corresponding features of a print head mounting socket of a print head carriage mounting plate on which the print head is to be mounted. The simulation plate socket includes an aperture characterized by precise dimensions of a corresponding aperture of the print head mounting socket of the print head carriage mounting plate. The simulation plate further includes a plurality of kinematic coupling components configured to engage cooperating kinematic coupling components of an alignment adapter when the alignment adapter is mounted in the simulation plate socket to precisely align the alignment adapter in a predetermined position relative to the simulation plate socket. The alignment adapter also includes an aperture through which nozzles of a print head mounted in said alignment adapter are exposed. The system further includes one or more cameras configured to obtain images of the nozzles of the print head exposed through the alignment adapter aperture and corresponding simulation plate socket aperture when the alignment adapter with print head mounted therein is mounted in the simulation plate socket of the simulation plate. The system further includes one or more translation stages responsive to one or more control signals to adjust a position a print head mounted in the alignment adapter, and one or more processors configured to process an image from the one or more cameras to determine a position of a first print head nozzle in the image and to locate a first row of nozzles in the image. The one or more processors are further configured to determine and generate the one or more control signals for the one or more translation stages to position the print head to align the print head nozzles relative to one or more features of the alignment adapter.

In still another embodiment, a method for increasing resolution of printed matter to be printed using a print head carriage comprising a plurality of print heads includes the steps of aligning a first set of one or more print heads in a first set of corresponding one or more print head sockets, the first set of print heads aligned, with a first offset, relative to a predetermined location on the print head carriage, and aligning a second set of one or more print heads in a second set of corresponding one or more print head sockets, the second set of print heads aligned, with a second offset different than the first offset, relative to the predetermined location on the print head carriage.

In still another embodiment, a pre-aligned print head assembly includes a first set of one or more print heads mounted on one or more first alignment adapters, the first set of print heads aligned, with a first offset, relative to a predetermined location on the respective one or more first alignment adapters. The pre-aligned print head assembly further includes a second set of one or more print heads mounted on one or more second alignment adapters, the second set of print heads aligned, with a second offset different than the first offset, relative to a predetermined location on the respective one or more second alignment adapters. Preferably, the first offset and the second offset are less than a pixel in difference, for example half a pixel distance.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein:

FIG. 1 is a representational view of an embodiment of a printing system which incorporates digital printing technology;

FIG. 2A is a perspective view, taken from above, of an embodiment of a print head carriage;

FIG. 2B is a perspective view, taken from below, of the print head carriage of FIG. 2A:

FIG. 3 shows a bottom-up view of a print head carriage loaded with print heads;

FIGS. 4A and 4B are perspective views of an exemplary embodiment of a print head;

FIG. 4C is a view of the nozzle end of an exemplary embodiment of a print head;

FIG. 5 is a schematic diagram depicting the overall concept of a novel print head alignment adapter and alignment technique;

FIG. 6 is a perspective view of an exemplary embodiment of an alignment adapter and corresponding print head carriage mounting plate;

FIG. 7 is a schematic diagram illustrating the concept of kinematic coupling;

FIG. 8A, which shows a top-down view of an embodiment of a print head assembly including a print head mounted in an alignment adapter;

FIG. 8B shows a front side view of the assembly mounted on a print head carriage mounting plate;

FIG. 8C is a side view of the assembly of FIGS. 8A and 8B mounted in correct position on a print head carriage mounting plate;

FIG. 9 is a perspective view of the alignment adapter of FIG. 6 and an alternative embodiment of the corresponding print head carriage mounting plate;

FIG. 9A shows a perspective cross-sectional view of a portion of the mounting plate of FIG. 9;

FIG. 10 is a perspective view of the alignment adapter of FIG. 6 and another alternative embodiment of the corresponding print head carriage mounting plate;

FIG. 10A shows a perspective cross-sectional view of a portion of the mounting plate of FIG. 10;

FIG. 11 is a perspective view of an alternative embodiment of an alignment adapter and corresponding print head carriage mounting plate;

FIG. 11A shows a perspective cross-sectional view of a portion of the mounting plate of FIG. 11;

FIG. 11B is a perspective view of the print head and alignment adapter assembly showing the nozzle end of the assembly; FIG. 11 is a perspective view of an alternative embodiment of an alignment adapter and corresponding print head carriage mounting plate;

FIG. 12 is a perspective diagrammatic view of the assembly of an alternative embodiment of an alignment adapter and corresponding print head carriage mounting plate;

FIG. 13A illustrates an image of a portion of the set of nozzles captured by a camera when a print head is mounted in a socket of the alignment adapter and mounted on the simulation plate within the calibrated system;

FIG. 13B shows the image of FIG. 13A with a calculated line representing a row of nozzles and a corresponding target line to which the calculated line should align;

FIG. 13C shows the image of FIG. 13A with a calculated line representing a row of nozzles and a corresponding target line to which the calculated line should align with the addition of a non-zero sable angle $\Theta$;

FIG. 14 is a flowchart of an exemplary method for aligning a print head to an alignment adapter;

FIG. 15 is a perspective view of an exemplary pre-alignment calibration system for pre-aligning a print head to an alignment adapter:

FIG. 15A is a perspective cross-sectional view of a spring assembly used in the calibration system of FIG. 15;

FIG. 16 is a top-down view of the calibration system of FIG. 15;

FIG. 17 is a flowchart illustrating an exemplary process for pre-aligning a print head to an alignment adapter;

FIG. 18 is a bottom-up view of an embodiment of an alignment adapter with print heads mounted therein with the nozzle ends of the print heads exposed through respective apertures in the alignment adapter;

FIG. 18A is a zoomed-in view of a portion of the view of FIG. 18, illustrating the nozzle alignment offset between adjacent print heads;

FIG. 19 is a bottom-up view of an embodiment of a print head carriage mounting plate configured with multiple print heads of each ink color mounted thereon with the nozzle ends of the print heads showing through the bottom of the plate;

FIG. 20 is an operational flowchart of an exemplary embodiment of an automated print head alignment tool, for example the tool shown in FIGS. 15 and 16;

FIG. 21 is a screenshot of an exemplary graphical user interface through which a human operator may interact with an automated print head alignment tool, for example the tool described in FIGS. 15, 16 and/or 20;

FIG. 21A is an exemplary embodiment of a popup window which may be displayed to the human operator when the operator selects an alignment type selection control;

FIG. 22 is a block diagram of a computer system which may be used to implement various computing features required in various embodiments of the invention;

FIG. 23A is a resource utilization diagram for prior art print head alignment techniques;

FIG. 23B is a resource utilization diagram for print head alignment using the alignment techniques and tools described in conjunction with the present invention;

FIG. 24A is a schematic diagram illustrating the orientation of a print head relative to a scan axis; and FIG. 24B is a schematic diagram illustrating the orientation of a print head relative to a scan axis with a non-zero sable angle introduced.

DETAILED DESCRIPTION

To solve the problems indicated above, offline print head alignment is performed by loading and pre-aligning individual print head(s) on an alignment adapter, and then aligning and fixing the loaded alignment adapter to the print head carriage. The alignment adapter includes precision locating features that precisely align with precision locating features on the carriage such that the alignment adapter is placed in a precise location relative to the print head carriage every time. To align a print head to the alignment adapter, the print head is fitted into the alignment adapter as assisted by print head mounting features of the alignment adapter. The print head spatial position and/or angular rotation is adjusted, either manually and/or automatically, with respect to the alignment adapter to align the print head such that the nozzles of the print head are located in predetermined aligned positions relative to features of the alignment adapter. Once the print head is aligned to the alignment adapter, it is locked in position to maintain the precision alignment. The use of an intermediate alignment adapter between the print head(s) and print head carriage allows the loading and pre-alignment of print head(s) to a replacement alignment adapter ahead of the time that such replacement print head(s) are needed by the printing system, requiring only the amount of printing system downtime that it takes to remove the current alignment adapter from the print head carriage and to snap in the loaded replacement alignment adapter to the print head carriage using the cooperating precision alignment features of the alignment adapter and print head carriage. In many systems, the systems and methods described herein can reduce the time required for the print head alignment process from days and hours down to a few minutes.

Turning first to a general description of terminology, in general, and as used herein, the "scan axis" is in a direction parallel to the direction of relative motion between the print head carriage and print substrate when ink is ejected from the print head nozzles. Depending on whether the printing system is a single-pass printing system or a multi-pass printing system, the scan axis may be either parallel to or perpendicular to the feed axis.

In general, the "feed axis" is in a direction parallel to the direction of the relative motion between the print head carriage and the substrate as the substrate is advanced through the printing system.

In general, a print head includes a plurality of nozzles arranged in one or more rows of nozzles. The long axis of the print head is generally parallel to the rows of nozzles, and is referred to herein as the "nozzle axis". In general, a print head is oriented on the print head carriage such that the nozzle axis is perpendicular to the scan axis.

In a single-pass printing system, the feed and scan axis are parallel, and the print head carriage and the print substrate are moved relative to one another along the feed axis to print the entire image in one scan of the print head carriage across the substrate (or, alternatively, one scan of the substrate past the print head carriage).

In a multi-pass printing system, the feed and scan axis are transverse, and the print head carriage and the print substrate are moved relative to one another in a reciprocating manner along the scan axis to print sections of the image called "swaths", one swath at a time. In a multi-pass system, after the completion of one print swath (by the relative movement between the print head carriage and substrate along the scan axis from one end of the axis to the other), the print head carriage is advanced, along the feed axis, relative to the substrate by one swath unit (typically the print width of the print head carriage) and the next swath is then printed. This occurs repeatedly, one swath, at a time until the entire image is printed. In a multi-pass printing system, the print head carriage scans the substrate multiple times (in the scan direction transverse to the feed direction) to print a single image.

Referring to FIG. 24A, in general, the highest print quality is achieved when the nozzle axis 3 of the print head 100 is perpendicular to the scan axis 2—that is, the nozzle axis 3 forms a print plane 4 that is perpendicular to the scan axis 2. The angle Q of the print head relative to the print plane 4 is often referred to as the print head "saber angle". For highest print quality, the print head saber angle Q is 0° relative the print plane 4. In some applications, it may be advantageous rotate the angle of the print head to print at a resolution higher than its native resolution. Note in FIG. 24B that when the print head saber angle is adjusted to $Q_1$ greater than $Q_0=0°$ (for exaggerated example, $Q_0=45°$), the number of ink droplets that the print head can print within a given width increases. Thus, the saber angle allows one to find a tradeoff between print width and print quality versus print resolution, which may be advantageous for some applications.

Turning now to the drawings, FIG. 1 is a representational view of an exemplary embodiment of a single-pass printing system 10 which incorporates digital printing technology. As shown, the printing system 10 includes a main system frame 12 for providing stability and structure for the components of the system 10, and to which is mounted, attached and/or affixed a tray conveyance system 20 and a print frame 30. The tray conveyance system 20 is configured to convey a tray 22 linearly along a feed axis 5 which is parallel to the scan axis 2. The tray 22 is configured to carry one or more substrates 24 having target print area(s) on which an image is intended to be printed. The tray 22 is conveyed in a forward direction along the scan axis 2, and ultimately passes under a print head carriage 40, which digitally prints an image in the target print area of the substrate. In an embodiment, as shown in FIG. 1, the print head carriage 40 remains in a fixed position for single-pass printing. In an alternative embodiment (not shown), the substrate remains fixed while the print head carriage 40 is moved along the scan axis 2 to print an image in a single pass.

In an alternative embodiment (not shown), the printing system is a multi-pass printing system, wherein the print head carriage 40 is oriented transverse to the feed axis 5 (i.e., transverse to the orientation of the print head carriage 40 in the single-pass system). The system includes a reciprocating mechanism for controlling the movement of the print head carriage to print one swath at a time.

FIGS. 2A and 2B show a more detailed view of the print head carriage 40. FIG. 2A provides a perspective view, taken from above, of the print head carriage 40. The print head carriage 40 includes a cover 46, which is shown as transparent for convenience of viewing the internals of the print head carriage 40. FIG. 2B is also a perspective view, taken from below, of the print head carriage 40, also with the cover 46 shown as being transparent. In the embodiment shown, the print head carriage 40 includes a print head carriage mounting plate 42, a mounting member 44, and cover 46. The print head carriage 40 is configured to carry a number of individual print heads 50. The print head carriage mounting plate 42 is correspondingly configured with a corresponding number of sockets 43 configured with apertures 45 through which the nozzle ends of the respective print heads 50 are exposed to the bottom surface 41 of the plate 42 when the respective print heads 50 are fixedly seated in their respective sockets 43. The print head carriage 40 itself is mounted on the print frame 30 with the bottom surface 41 of the print head carriage mounting plate 42 facing the target print surface of the print substrate 24. The print heads 50 are precision mounted on the top surface of the mounting plate 42 such that all of the print head nozzles of all of the print heads lie along the same plane (referred to as the "nozzle head plane") and are exposed through the bottom surface of the plate 42. When the print head carriage 40 is mounted properly on the print frame 30 with the print heads 40 properly aligned therein, the nozzle head plane faces and is parallel to, the plane defined by the carrying surface of the tray 22.

FIG. 3 shows a bottom-up view of a loaded print head carriage 40, illustrating an exemplary layout of the print heads 50. In the embodiment shown, the print head carriage 40 is designed to print the ink colors Cyan (C), Magenta (M), Yellow (Y), and blacK (K). In the embodiment shown in FIG. 3, the print head carriage 40 is configured to hold twenty individual print heads 50. The print head carriage 40 itself includes twenty individual sockets 43 configured to hold one print head 50 each. Each socket 43 is configured with an aperture 45 through which nozzles of a print head 50 mounted therein are exposed through the bottom surface 41 of the print head carriage mounting plate 42. The print head sockets 43 are arranged in four sections (labeled "C", "M", "Y", "K"), each section corresponding to a different one of the ink colors CMYK and including five sockets 43 arranged in alternating offset rows of 3, 2, 3, 2, as shown, to seat five print heads 50 for each ink color. In the embodiment shown, print heads of each ink color are staggered across two rows to increase the print width of the print head carriage 40. It is to be understood that the layout, number, and configuration of the print heads on the carriage is illustrative rather than limiting and that the layout, number, and configuration of print heads on the carriage may differ from system to system without departing from the scope of the invention.

FIGS. 4A and 4B are perspective views of an exemplary embodiment of a print head 100 which may embody one or more of the print heads 50 loaded onto the print head carriage 40. For convenience of explanation herein, when referring to the axes of a print head hereinafter, the long axis of the print heads is referred to as the x-axis (or "nozzle axis"), whereas the short axis of the print heads is referred to as the y-axis (or "scan axis").

As illustrated, in FIGS. 4A and 4B the print head 100 includes a head chip 150 mounted in a housing 160. Within the head chip 150, micro scale channels (not shown) made from piezo electric material are made to contract by the application of an electric charge. As the channels contract, ink contained in the channels is forced out through corresponding nozzles 164 as individual droplets. As the channels are returned to their original state, capillary action causes ink to flow from ink reservoir(s) into the corresponding channels making them ready to produce the next droplets.

FIG. 4C shows a view of the nozzle end of an exemplary print head 100. The housing 160 includes a nozzle face 161 having an aperture 162 through which a nozzle plate 163 exposes a plurality of nozzles 164 (also known as "nozzle apertures"). In the embodiment shown, the nozzles 164 are arranged in linear rows of interlaced sets (Group A, Group B, Group C) of nozzles 164. As mentioned previously, the nozzle pitch is on the order of tens of microns (for example, in one embodiment, 70 microns); hence the accuracy of the alignment of the print head is desired to be on the order of half that amount or better.

As noted, the accuracy of the alignment of the positions of the nozzles 164 of the print head when the print head is mounted on the print head carriage is highly important when it comes to print quality. In order to target such accuracy, the seated print head 100 can be externally manipulated to adjust the spatial position and the rotational orientation of the print head 100 as necessary to position and align the nozzles 164 of the print head 100 into a desired aligned position. The housing 160 includes a pair of holes 168a, 168b through which can be inserted respective fixing screws 169a, 169b (not shown, but see FIGS. 5 and 16) to secure the position of the aligned print head 100 on the carriage mounting plate 42. Additionally, or alternatively, glue can be applied to the nozzle face 161 of the housing 160 to secure the print head 100 in aligned position.

FIG. 5 depicts the overall concept of the novel print head alignment technique. FIG. 5 shows a print head 100 and an embodiment 120 of a print head carriage mounting plate 42 of a print head carriage 40. Alignment of a print head 100 on a print head carriage mounting plate 120 is achieved by way of a print head alignment adapter 110. As shown, a print head 100 is mounted and aligned on a print head alignment adapter 110, which generally includes a plate with a mounting socket 112 configured therein. The loaded alignment adapter 110 (i.e., the alignment adapter 110 with print head 100 mounted and aligned thereon) is then mounted in a socket 122 of the print head carriage mounting plate 120. The print head alignment adapter 110 and the print head carriage mounting plate 120 contain respective cooperative precision alignment features which ensure that when the alignment adapter 110 is mounted in a socket 122 of the print head carriage mounting plate 120, the alignment adapter 110 is always aligned in a known precise position.

In a preferred embodiment, the precision alignment features of both the print head alignment adapter 110 and the print head carriage mounting plate 120 are manufactured such that the alignment adapter 110 kinematically couples to the alignment adapter 110 to constrain all six degrees of freedom of movement (e.g., x-, y-, and z-positions, as well as angular rotations $\Theta(x)$, $\Theta(y)$, and $\Theta(z)$ (i.e., the rotational angle about the x-, y-, and z-axis, respectively).

Using kinematic principles, the alignment adapter 110 couples to a socket 122 using a "go"/"no-go" model—that is, the alignment adapter 110 snaps directly into place with perfect fit (within a predetermined (for example but not limitation, 0.05 microns) tolerance in all six degrees of freedom) within a socket 122 in a manner similar to the way a puzzle piece snaps and fits properly in place in a jigsaw puzzle. To this end, both the print head alignment adapter 110 and the print head carriage mounting plate 120 include alignment features that are manufactured with such precision that they need not be further aligned once snapped into position in a corresponding socket 122 of the carriage mounting plate 120. Of course, it is noted that in any manufacturing process, there will always be some level of error between the manufacturing specification and the actual manufactured parts; however, the manufacturing process is required to be very highly precise and controlled so as to meet high tolerance levels such that the degree of error from specification is, in a preferred embodiment, at least an order of magnitude, and preferably more than one order of magnitude, smaller than the pitch of adjacent nozzles.

In a preferred embodiment, all alignment adapters 110 are precision manufactured to be identical (within specification as noted above) and all print head sockets 122 (each of which includes an aperture 123 through which the nozzles of a print head mounted therein are exposed) in the print head carriage mounting plate 120 are precision manufactured to also be identical (within specification as noted above). Therefore any alignment adapter 110 can be mounted in any socket 122 of the print head carriage mounting plate 120 for which it was designed.

The print head 100 itself is aligned to the precision features of the alignment adapter 110. The print head 100 is first mounted in a nominal position in a socket 112 of the alignment adapter 110. Once mounted, the positions of two or more nozzles with respect to features of the alignment adapter 110 are determined, and these positions are used to determine the offset by which the spatial x-, y-, and/or z-position(s) and/or the rotational positions of the print head 100 should be adjusted to orient and align the print head 100 into a desired predetermined position with respect to the alignment adapter 110. Once the adjustment offsets are known, the spatial and rotational adjustments can be made. In one embodiment, for example, the x-, y-, and z-positions, as well as the angular orientations about the x-, y-, and z-axes are adjusted utilizing high-precision manipulators, under the control of a skilled technician. In an alternative embodiment, the adjustments are made by an automated manipulation system. Once adjusted, the print head is then fixed in place with respect to the alignment adapter 110, for example by gluing the print head in place in the socket 112, by inserting fixing screws attaching the print head to the plate, etc. The alignment adapter 110, with aligned print head 100 fixed therein, is then quickly and easily mounted, and thereby automatically aligned, in place on the print head carriage mounting plate 120.

The concept outlined in FIG. 5 thus allows a print head 100 to be aligned to the alignment adapter 110 far in advance of mounting the alignment adapter 110 to the print head carriage mounting plate 120.

FIG. 6 is a perspective view of the alignment adapter 110 and print head carriage mounting plate 120 incorporating a preferred implementation of the precision alignment features. The alignment adapter 110 is configured with a socket 112 having an aperture 113 through which nozzles 164 of the print head 100 are exposed when the print head 100 is mounted in the socket 112. In an embodiment, the socket 112 is configured with inner walls 114a having a surface area which provides structure to which glue or other adhesive may be applied in order to fix a print head 100 (and more specifically outer walls 104a of the housing 160) in place within the adapter socket 112 once the print head 100 is inserted and adjusted to the desired alignment. The aperture 113 is configured to have dimensions generally having the same cross-sectional shape of the print head housing 160 (see FIG. 4B). The aperture 113 is slightly oversized with respect to the outer dimensions of the print head housing; that is, the aperture dimensions (e.g., length and width) include large enough clearance (e.g., at least greater than half the nozzle pitch distance) to handle all adjustments in the x- and y-translation planes which may be needed for aligning the print head 100, along with providing sufficient clearance to allow for rotational adjustments, including sable angle rotations if desired.

The alignment adapter 110 further includes spherical member receivers 117a, 117b, 118 which are configured to receive and engage a ball or a base of an element having a spherical portion characterized by a radius. In the embodiment shown, the spherical member receivers 117a, 117b, 118 are recesses in the bottom of the alignment adapter 110 that are configured to hold predetermined diameter balls 137a, 137b, 118, respectively. The balls 137a, 137b, 138 are inserted and optionally glued into the respective receivers 117a, 117b, 118. In an alternative preferred embodiment (not shown), the receivers 117a, 117b, 118 are each implemented using a kinematic coupling component such as, but not limited to, a v-block, discussed hereinafter, and are likewise configured to make contact and hold (via glue or other adhesive) balls 137a, 137b, 138, respectively. In an embodiment, the balls 137a, 137b, 138 are constructed of a metallic or hard plastic rigid material. The exposed portion of the balls 137a, 137b, 138 (or the spherical end of a spherical element) operates as a male kinematic coupling component which cooperates with a female kinematic coupling component in the print head carriage mounting plate 120 when the alignment adapter 110 is mounted on the plate 120, as discussed in more detail hereinafter.

As previously mentioned, in an exemplary embodiment, the alignment adapter 110 also includes socket walls 114 having an inner surface 114a for contacting the outer walls 104 of the print head housing 160 of the print head 100. Glue or other adhesive can be applied to the walls 104 of the print head housing 160 when the print head 100 is positioned in desired accurate alignment to thereby permanently fix the print head in aligned placement with respect to the alignment adapter 110, resulting in the pre-aligned assembly 130 which includes the print head 100 fixed in alignment in an alignment adapter 110.

As further shown in FIG. 6, the print head carriage mounting plate 120 is configured with a socket 122 having an aperture 123 formed therein through which the exposed nozzles 164 of the print head 100 in the pre-aligned print head assembly 130 will be exposed when the assembly 130 is mounted in the socket 122. In an embodiment, the aperture 123 is configured with the shape and dimensions of the outer cross-sectional shape and dimensions of the portion of the print head housing 160 that will be inserted therein (plus a very small additional clearance to ensure the print head housing 160 can be inserted therein).

In the embodiment shown in FIG. 6, the print head carriage mounting plate 120 includes kinematic coupling components configured to couple with cooperating kinematic coupling components on the bottom of the alignment adapter 110. Kinematic couplings are cooperating features used in precisely aligning two parts together, and have long been known to be able to provide sub-micrometer repeatability because they use spherical surfaces (e.g., hemispheres) anchored to one part or surface to mate with three centrally pointing grooves in another part or surface. This provides six points of contact which, both mathematically and practically, deterministically defines the six degrees of freedom needed to define the position and orientation of one part or surface with respect to another.

FIG. 7 illustrates the concept of kinematic coupling. A first kinematic coupling component includes a set of three V-shaped grooves 72a, 72b, 72c, formed in a plate 70. A second plate 74 includes three male components 75a, 75b, 75c in the form of (but not limited to) balls having a spherical hemisphere protruding from a surface of the plate 74. When a male component 75a, 75b, 75c is placed in abutment with a corresponding groove 72a, 72b, 72c, it establishes two points of contact. Thus, the kinematic coupling as a whole establishes six points of contact for purposes of aligning the two plates 70, 74. Although illustrated herein as grooves and balls, the kinematic coupling components are not limited to the use of grooves and balls. It is merely necessary to establish six points of contact between the male and female components. The male components and female components are located at corresponding locations so as to engage with one another when the plates are placed on top of each other as illustrated. In a kinematic coupling, any misalignment between the plates 70, 74, will automatically be adjusted. The beveled sides of the v-shaped grooves 72a, 72b, 72c insure that the convex surfaces of the male components 75 always center themselves in the groves 72a, 72b, 72c. Also, since the grooves 72a, 72b, 72c are directed outwardly, they interact with the male components 75a, 75b, 75c avoiding any lateral displacement between the plates 70, 74. The plates 70, 74 automatically align themselves thereby avoiding complicated external alignment.

Returning to FIG. 6, the kinematic coupling components are implemented using v-grooves 127 (127a and 127b), 128 and balls 137a, 137b, 138. A v-groove includes two flat prismatic surfaces inclined at an angle to each other, forming a "v". When used in conjunction with a ball or spherical body, the v-groove operates to constrain two degrees of freedom, with higher repeatability the steeper the included angle of the prismatic surfaces of the v-block. Three such v-grooves are used in conjunction with respective balls or spherical bodies, thereby constraining all six degrees of freedom in 3-dimensional Cartesian space. The angle of the "v" in a v-block is generally between 60° and 120°, with higher repeatability (but higher strain on the ball) for angles closer to 60°. In an exemplary embodiment, the angle of the "v" is 90°.

FIGS. 8A-8C illustrate the cooperating interaction of the precision features of the alignment adapter 110 with the print head carriage mounting plate 120 for the embodiment shown in FIG. 6. As illustrated, the features constrain the movement of the plates 110 and 120 with respect to one another in 6 degrees of freedom (positional along the x, y, and z dimensions, and angular rotations, $\Theta(x)$, $\Theta(y)$, and $\Theta(z)$, about the x-, y-, and z-axis, respectively).

As illustrated in FIG. 8A, which shows a top-down view of the print head assembly 130 mounted on the print head carriage mounting plate 120, a v-groove 127 embedded in the print head carriage mounting plate 120 blocks the y-axis movement, whereas the v-groove 128 blocks the x-axis movement. The balls 137a, 137b, 138 are glued into respective receivers 117a, 117b, 118 on the plate so they do not move relative to the alignment adapter 110. Alternatively, the balls 137a 137b, 138 are not actually glued but adjust themselves automatically to a fixed position between the kinematic coupling components 117a, 117b, 118 and grooves 127a, 127b, 128 when the assembly 130 is mounted to the print head carriage mounting plate 120. Whether glued or not glued, the exposed portions of the balls 137a, 137b, 138 fit within the respective grooves 127a, 127b, 128, providing 6 points of contact between the balls and grooves, and constraining the movement of the alignment adapter 110 relative to the plate 120.

FIG. 8B shows a front side view of the assembled print head 100/alignment adapter 110 assembly 130 assembled and mounted on the print head carriage mounting plate 120, illustrating how the cooperating kinematic coupling components including the v-groove 128 and ball 138 limits movement in the x-axis.

FIG. 8C shows a side view of the assembly 130 (including print head 100 mounted in alignment adapter 110) mounted in correct position on the plate 120 with an exploded view illustrating how the cooperating kinematic coupling components including the v-groove 127b and ball 137b limits movement in the y-axis. As is illustrated, the ball 137b contacts the v-groove 127b in only two places, A and B. Each kinematic coupling provides two such points of contact. Since the design includes three such cooperating kinematic couplings (v-groove 127a/ball 137a; v-groove 127b/ball 137b; v-groove 128/ball 138), the alignment adapter 110 engages the mounting plate 120 at 6 points of contact. As described previously with respect to FIG. 7, providing 6 points of contact using kinematic couplings limits movement of the components 110, 120 with respect to one another in all 6 degrees of freedom, thereby ensuring precise alignment of the alignment adapter 110 to the print head carriage mounting plate 120 with a high degree of accuracy for every alignment adapter 110 mounted on the print head carriage mounting plate 120. It is such precision alignment features which allow offline print head alignment to be performed by guaranteeing that the alignment of the alignment adapter 110 to the print head carriage mounting plate 120 is the same every time (or within a highly accurate and small degree of tolerance). This allows the print head 100 to be pre-aligned to the alignment adapter 110 prior to mounting of the print head assembly 130 on the mounting plate 120 of the carriage 40 itself.

In the embodiment shown in FIG. 6 and FIGS. 8A-8C, at least one v-groove 127, 128 is formed parallel to each of the respective x- and y-axes of the socket 122. Note that v-grooves 127, 128 span the entire x- and y-axes of the alignment adapter 110 to allow for simplified machining, and in the case of v-groove 127, to allow both kinematic coupling components 137a, 137b to share the same v-groove (albeit on different ends of the socket 122 at 127a and 127b). Further, in an exemplary embodiment each v-groove 127, 128 spans the entire respective length and width of the plate 120 (or at least a portion thereof). The advantage of using a spanning v-groove as opposed to individual v-grooves for each socket 122 on the print head carriage mounting plate 120 is the simplicity of design and ease of precision manufacturing or machining over that of individual v-grooves (often referred to in the industry as "v-blocks"). A single spanning v-groove can be shared and used as a kinematic coupling feature for multiple individual sockets 122 (i.e., same x-axis v-groove 128 for those sockets 122 lined in the same row, and the same y-axis v-groove 127 for those sockets 122 lined in the same column of the print head carriage mounting plate 120), and because the multiple individual sockets 122 are constrained by the same spanning v-groove, the print head assemblies 130 aligned in the multiple individual sockets 122 are also thereby naturally positioned in alignment with one another lying in the same respective row or column.

Although an exemplary technique for implementing cooperating kinematic coupling components has been described with respect to FIG. 6 and FIGS. 8A-8C, alternative cooperating kinematic coupling components may be implemented instead. For example, the kinematic coupling features of the print head carriage mounting plate 120 may be alternatively implemented as shown in FIG. 9. In FIG. 9, three individual v-grooves 147a, 147b, 148, or v-blocks, are machined into the print head carriage mounting plate 120a outside the perimeter of each socket 122. FIG. 9A shows a perspective cross-sectional view of a portion of a mounting plate 120a with a v-block 148 machined therein. The print head assembly 130 is the same as in FIGS. 6 and 8A-8C.

In another alternative embodiment, shown in FIG. 10, the female kinematic coupling component is implemented by machining a cantilevered hole 156a, 156b, 156c into the print head carriage mounting plate 120b, and inserting and gluing therein a kinematic coupling v-block component 157a, 157b, 158, a cross-section of which is shown in FIG. 10A.

In yet another alternative embodiment for implementing the cooperating precision coupling features of the print head carriage mounting plate 120c and alignment adapter 110c, shown in FIG. 11, the female kinematic coupling component may be implemented as an integrated quasi-kinematic coupling groove 167a, 167b, 168, a perspective view of which is shown in FIG. 11A. The corresponding cooperating male kinematic coupling component 165 is attached to the alignment adapter 110c and is configured to fit within the groove 168 in only one position. When three such cooperating pairs are used, as between the alignment adapter 110c and the print head carriage mounting plate 120c of FIG. 11, the components 110c and 120c engage in only one orientation.

In yet a further alternative embodiment, shown in FIG. 12, the precision coupling may be implemented using a high-precision machined socket wherein points along the outer wall of the alignment adapter 110d contact points of the socket in at least 6-points of contact. For example, as shown in FIG. 12, the print head carriage mounting plate 120d is configured such that each socket 122 provides three accurate benching surfaces 178a, 178b, 178c for the housing 160 of each print head 100 to align against. This type of configuration provides at least 6 points of contact to provide limitation of movement in 6 degrees of freedom.

As described earlier, the accuracy of the positional and angular alignment must be within a few microns to achieve the highest print quality. Applying kinematic or quasi-kinematic coupling techniques to the implementation of the cooperating precision alignment features of the alignment adapter 110 and print head carriage mounting plate 120 for precision alignment with respect to each other ensures that all pre-aligned print head assemblies 130 are placed in known predetermined alignment with the print head carriage mounting plate 120 of the print head carriage 40 when mounted thereon.

According to aspects of the present invention, the print head 100 is aligned not with respect to the print head carriage 40 (or print head carriage mounting plate 120) but rather with respect to the alignment adapter 110. It is this feature of aligning the print head 100 to the alignment adapter 110 rather than directly to the carriage mounting plate 120, along with the systemic and accurate alignment features guaranteed between the alignment adapter 110 and carriage mounting plate 120, that allows the print head to be pre-aligned to an alignment adapter in advance of the time the replacement print heads are needed. The pre-alignment process may be performed without taking down the printing system. Furthermore, the cooperating precision coupling features of the alignment adapter 110 and print head carriage mounting plate 120 allow the actual replacement process to be performed in a matter of a few seconds by merely roughly aligning the pre-aligned alignment adapter/print head assembly 130 to a socket 122 of the print head carriage mounting plate 120 and essentially snapping the assembly into precision alignment within the socket 122. Print head replacements on a fully loaded print head carriage can therefore be accomplished in a matter of mere minutes. Fixing screws 169a, 169b are inserted through the fixing screw holes 168a, 168b of the print head housing 160 and through the fixing screw holes 129a, 129b of the alignment adapter 110 and through fixing screw holes in the print head carriage mounting plate 120 to affix the print head assembly 130 to the print head carriage mounting plate 120.

Moving now to methodologies for aligning the print head 100 to the alignment adapter 110, with reference to FIGS. 13A and 13B, there is shown therein a bottom-up view of a section of a print head nozzle plate of a print head 100. As will be appreciated from this view, it is possible to determine the respective positional locations of the nozzles 164 relative to a position of reference. In an embodiment shown in FIG. 15, a calibration system 200 is configured to receive and securely hold in place an alignment adapter 110 in a precise predetermined position relative to a predetermined origin in a Cartesian-space (x, y, z) reference system. The alignment adapter 110 is precision manufactured such that its features and dimensions are within a very tight degree of tolerance with respect to one another and with respect to the precision features of the print head carriage plate(s) to which they may be adapted.

To align a print head 100 to an alignment adapter 110, the alignment adapter 110 is placed within a socket of a simulation plate 220 which is machined or otherwise configured with the features (e.g., aperture 45) and precise dimensions of a print head mounting socket 43 of a print head carriage mounting plate 120. The simulation plate 220 is securely held in a predetermined precalibrated position within the calibration system 200. The calibration system provides the positional reference system from which the desired and expected locations of the individual nozzles 164 of a print head 100 mounted on the alignment adapter 110 can be initially set or determined. Such positions are referred to herein as the "expected" nozzle positions. In one embodiment, the origin of the reference system may be preset as a desired position for one of the nozzles.

FIG. 14 is a flowchart of an exemplary method for aligning a print head to an alignment adapter. As illustrated, an alignment adapter 110 is placed in a predetermined position (step 1401), for example in a calibration system 200 where the alignment adapter 110 in a precise known position relative to a predetermined origin in a Cartesian-space (x, y, z) reference system. A print head 100 is mounted in a seated, yet adjustable, position on the alignment adapter 110 (step 1402). A set of expected nozzle positions is obtained (step 1403) which represent the expected x, y positions of corresponding nozzles 164 of the print head 100. In an embodiment, the expected x, y positions are the ideal locations of the respective nozzles 164 when the print head 100 is mounted in a socket 112 of the alignment adapter 110 and the alignment adapter 110 is mounted in a known position within the calibrated positional reference system provided by the calibration system 200. The calibration system 200 therefore includes a plate 220 which simulates the print head carriage mounting plate 120. The plate 220 therefore includes the same kinematic coupling features in the same respective locations as the print head carriage mounting plate 120 on which the alignment adapter 110 will be ultimately mounted. The goal of the alignment process is to position the print head 100 within the socket 112 of the alignment adapter 110 so that the nozzles 164 of the actual print head 100 align to the ideal, or "expected", nozzle locations.

Returning to FIG. 14, the actual nozzle positions of the seated print head 100 are then determined (step 1404). In an embodiment, this is achieved by obtaining an image of the nozzle plate 163 relative to its position in the alignment adapter. In a preferred embodiment in FIG. 15, the image is obtained using one or more high-resolution cameras 210a, 210b. In an embodiment, the high-resolution cameras 210a, 210b are 2, 5, or greater Megapixel cameras with tele-centric macro lens and optical magnification (e.g., 2:1, 4:1, or greater)).

In general, alignment is achieved by iteratively measuring the actual positions $(x_1, y_1), (x_2, y_2), \ldots (x_n, y_n)$ of the nozzles (step 1404), comparing the actual positions of the nozzles to the expected positions (step 1405), and adjusting the position of the print head 100 based on feedback from the comparison (step 1406). In an embodiment, the positions of at least a plurality (if not all) of the print head nozzles 164 are obtained relative to the calibrated reference system set up within the calibration system 200. In an embodiment, individual rows of nozzles 164 are identified from the imaged set of nozzles. For each identified row (e.g., Group A, Group B, Group C) of nozzles, a corresponding line representing the row is calculated. In a particular embodiment, the line is calculated using linear regression, which is a well-known technique. For example, referring to FIG. 13A, given an image of the nozzles 164 obtained when the print head 100 is mounted in a socket of the alignment adapter 110, which itself is mounted in a known predetermined position within the calibrated system 200, the actual x, y position of a number of nozzles 164 is obtained $(x_1, y_1), (x_2, y_2), \ldots, (x_n, y_n)$. Nozzles in the same set (e.g., Group A, Group B, Group C) are identified. Then, a line obtained by, for example, linearly regressing the points belonging to the same nozzle set (e.g., Group A, Group B, Group C) is calculated, for example as illustrated in FIG. 13B, and the angle between the regressed line and the ideal line position (i.e., saber angle $\Theta=0°$) is calculated. The calculated angle represents the required angular adjustment.

In general, when the print nozzle rows are perpendicular to the direction of Referring now to FIG. 13C, in some applications there exists a need or desire to align the nozzle axis to a saber angle greater than 0°. If this is the case, the required angular adjustment is the calculated angle (calculated as described above) plus the desired sable angle $\Theta$.

The required angular adjustment is translated into one or more translation adjustment commands to be sent to x- and y-translation stages 230a, 230b. Each translation stage 230a, 230b responds to the individual commands and/or signals sent to it by making the desired adjustment(s) as indicated by the received command(s)/signal(s).

In an embodiment, the system includes two different cameras—one 210a for use by the first translation stage 230b in centering the position of the first nozzle in the desired location of the first nozzle based on image information received from the camera 210a, and one 210b for use by the second translation stage 230b in aligning the angle of the print head based on image information from the camera 210b. The cameras themselves may be positioned within the jig 200 to known predetermined positions relative to the simulation mounting plate 220. In an embodiment, one camera is a 5 Megapixel camera with a telecentric macro lens, c-mount, configured with an optical magnification of 4:1, a working distance of 70.3 mm, Field of View (FOV): 1.2×1.6 mm, with a coaxial LED light, through an integrated half-mirror. In an embodiment the other camera is a 2 Megapixel camera with a telecentric macro lens, c-mount, configured with an optical magnification of 2:1, a focal distance of 66.9 mm, FOV: 2.4×3.2 mm, with a coaxial LED light, through integrated half-mirror. The system 200 includes one or more camera controllers (not visible in FIG. 15) configured for adjusting the cameras 210a, 210b themselves, and the positions of the cameras, by way of camera translation stages 211a, 211b.

FIG. 16 shows a top-down view of the calibration system 200. The simulation mounting plate 220 includes a socket and the same kinematic coupling components (in this example, v-grooves) as the intended print head carriage mounting plate 120. In operation, an alignment adapter 110 is inserted in the socket of the simulation mounting plate 220 and a print head 100 is inserted into the socket of the alignment adapter 110. The nozzle plate 163 and nozzles 164 are therefore exposed through the opening of the socket of the simulator plate 220 so as to be visible by the cameras 210a, 210b.

Actuator motor 231a is attached to translation stage 230a which is mounted on the frame 201. Actuator motor 231a is responsive to a controller (not shown), which signals the actuator motor 231a to advance or retract the translation stage 230a along the y-axis. A pedestal 232a is mounted on the translation stage 230a which holds an optical post 234a parallel to the y-axis and perpendicular to the x- and z-axes of the system 200.

Similarly, actuator motor 231b is attached to translation stage 230b which is mounted on the frame 201. Actuator motor 231b is responsive to a controller (not shown), which signals the actuator motor 231b to advance or retract the translation stage 230b along one or both of the x- and y-axes. A pedestal 232b is mounted on the translation stage 230b which holds an optical post 234b parallel to the x-axis and perpendicular to the y- and z-axes of the system 200.

The pedestals 232a, 232b are each configured to hold their corresponding optical posts 234a, 234b at a height such that the respective distal ends 235a, 235b of the posts are the same height as manipulation contact features 167a, 167b of the print head housing 160 when the print head/adapter assembly 130 is kinematically coupled to the simulation mounting plate 220. Likewise, to counterbalance the forces applied at the manipulation features 167a, 167b by the optical posts 234a, 234b, a spring assembly 240 is provided which includes a spring 242 (see FIG. 15A) attached to an optical post 243 arranged at a height designed to contact yet another manipulation contact feature 167c of the print head housing 160 when the print head/adapter assembly 130 is kinematic coupled to the simulation mounting plate 220. The spring 242 and optical post 243 assembly is oriented such that the direction of force applied to the manipulation contact feature 167c is at angle designed to counteract the forces applied along the x- and y-axes. In an exemplary embodiment, the spring force is arranged at 450 (between the x- and y-axes).

The simulation mounting plate 220 is mounted in a fixed position within the calibration system 200. The translation stages 230a, 230b are mounted on the frame 201 of the system 200 in fixed positions relative to the simulation mounting plate 220. Each of the translation stages 230a, 230b, optical posts 234a, 234b, simulation mounting plate 220, along with the positions, focal points, and settings of the cameras 210a, 210b, are calibrated to known positions and states relative to the one another. The actuator motors 231a, 231b are preferably high-precision linear motors which can translate the respective stages 230a, 230b with a granularity of a few nanometers.

The manipulation contact features 167a, 167b are used as manipulation contacts for aligning the position of the print head 100 relative to the alignment adapter 110. The optical posts 234a, 234b, 242 are initialized in a retracted position (away from the socket of the simulation mounting plate 220) when the assembly 130 including the print head 100 and alignment adapter 110 (loosely attached via fixing pins 169a, 169b) is first kinematically coupled to the simulation mounting plate 220. The optical posts 234a, 234b are then advanced to respective initial positions that place the alignment adapter 110 in a known position relative the origin of the Cartesian reference system within the system 200. The spring assembly 240 is then advanced to apply force against manipulation contact feature 167c to initially press the print head 100, within the alignment adapter socket 112, toward the x-y origin defined within the reference system 200.

FIG. 17 is a flowchart illustrating an exemplary process for pre-aligning a print head 110 to an alignment adapter 110. In general, the process involves iteratively aligning a first nozzle of the print head 100 to an expected position (steps 1702 through 1710) and adjusting the rotational angle of the print head 100 through the z-axis to align the row(s) of nozzles to an expected angle relative to one or more features of the alignment adapter 110. The steps for locating a first nozzle involve capturing an image of the nozzle plate of the print head using the first calibrated camera 210a within the calibrated system 200 (step 1702), locating within the image the actual location of a first nozzle (which can be any predetermined nozzle, but typically the nozzle closest to the predetermined origin of the calibrated reference system 200) (step 1704), comparing the actual location of the first nozzle to the expected location of the first nozzle (taking into account, if desired, a saber angle) (step 1706), and when the actual location of the first nozzle is not at the expected location calculating the positional adjustment value in the x- and y-translation planes (step 1708) and adjusting the x- and/or y-position of the print head via the x-y translation stage based on the calculated positional adjustment value(s) (step 1710). Steps 1702 through 1710 may be repeated until the first nozzle is within a predetermined x- and y-distance of the target nozzle location.

The steps involved in adjusting the rotational angle of the print head 100 involve identifying one or more additional nozzles belonging to the same selected row as the first nozzle (step 1712), calculating an angular offset of the selected row of nozzles based on the positions of the actual identified nozzles versus the expected (target) positions of the corresponding nozzles (step 1714), determining whether the angular offset is within a predetermined threshold of the expected angle of the selected row (step 1716), and if not, calculating an angular adjustment required to bring the row within the predetermined threshold of the target angle (step 1718) and adjusting the angle of the print head using the y-translation stage (step 1720), then iteratively repeating the whole process using the present position of the print head as the starting point. Once the actual angular offset is within the angular offset threshold (for example, 0.05 degrees) of the target angle (for example, 0 degrees), the print head 100 is considered aligned to the alignment adapter 100, and the print head may be fixed in its current position by gluing or otherwise affixing the print head 100 in place (step 1722). The process may iterate until the actual nozzle locations are positioned at their respective expected locations or until the angular adjustment threshold has been met (i.e., the statistical error between the actual angular offset and the expected angular offset).

The expected nozzle position may be the expected nozzle position when the print head is aligned with a 0° saber angle. Alternatively, a desired non-zero saber angle may be obtained and accounted for in the expected/target nozzle position.

In an embodiment, the captured image is mapped against a reticle (a predetermined x-y grid of pixels) and the (x-y) positions of all the detected nozzles is recorded in an array. The process may be repeated multiple times and the results averaged so that the array contains the average (x, y) position for each detected nozzle. Because the system 200 is built to precision and the distances and angles between system components are calibrated for high accuracy, the desired, expected, or target (x, y) positions of the nozzles relative to features of the system 200 and/or alignment adapter 100 (for example, relative to the positions of the calibrated cameras) will be known. Once the actual or average (x, y) position is determined, the x-, y-adjustment can be calculated and appropriate control signals sent to the x-y translation stage 230a to adjust the post 234a to manipulate the position of the print head 100.

In practice, to calculate the angle of the print head 100, the mapped nozzle locations are separated into lines that are on the same row, and each line is linearly regressed resulting in the well-known formula: $y=mx+b$, where m is the slope of the line, and b is the y-axis intercept. This step may be repeated multiple times and the results for the slope, m, averaged. The slope, m, corresponds to the angular offset and the amount of angular adjustment to the print head that is required. Once the angular offset is calculated, the appropriate control signals are sent to the y translation stage 230b.

The alignment operation can be automated by one or more processors running print head alignment software that communicates with the cameras and translation stages and may include a graphical user interface presented on display to allow operator input, discussed hereinafter.

The precision alignment of a print head to a print head carriage as enabled by the components, systems, tools and techniques described thus far further affords an additional advantage. Such precision of the alignment of a print head within a socket 112 of an alignment adapter 110 can also allow specification of one or more alignment offsets within a given socket. If the dimensions of the socket 112 of the alignment adapter 110 are sized slightly greater than the specified dimensions of the print head 110 by at least an amount to allow the print head to be adjusted along the x-axis (i.e., the nozzle axis) by a distance of half of a nozzle pitch or more, multiple print heads on a print head carriage mounting plate 120 can be offset relative to one another by way of precision alignment within the sockets themselves to achieve higher print resolution.

Referring to FIG. 18, there is shown therein a simplified alignment adapter 410 having a plurality of print head sockets 412 arranged in an 8×1 grid of 8 rows and a single column. Each print head is oriented with the nozzle axis corresponding to the direction of the rows and perpendicular to the direction of the column. The plate 410 includes a pair of sockets for each ink color (C, M, Y, K). In each pair of sockets, a first print head 400a is aligned in a first position relative to a first socket of the pair, and a second print head 400b is aligned in a second position relative to a second socket of the pair, where the first position and the second position are offset from one another along the nozzle axis (i.e., the x-axis) by a distance equal to a half of a nozzle pitch, as illustrated in FIG. 18A. Each socket 412 is identical in its dimensions to each other socket, and all sockets 412 are aligned in a single column as shown. The end result is that during a print operation, the second print head will produce ink dots that are interlaced with the ink dots produced by the first print head, thereby doubling the print resolution achievable by the printing system. Furthermore, doubling of the print resolution is achieved not by machining the sockets themselves by a half nozzle pitch (which is difficult to achieve given the required precision), but by merely aligning the print heads themselves relative to one another within identical sockets.

An increase in print resolution may be similarly achieved by increasing the saber angle of the print heads. The alignment mechanisms described herein may be similarly used to allow one to adjust the saber angle of the print heads without having to have a specialized print head carriage mounting plate that allows for such adjustments.

The particular placement configuration of print heads on a print head carriage may vary from printing system to printing system. In a printing system such as that shown in FIG. 1, multiple print heads may be arranged in alternating rows (x-axis) with staggered offsets, arranged so as to widen the print coverage of the print head carriage. Current inkjet technology limits the length of the nozzle rows, and therefore the print width, of a given print head to less than 100 mm. FIG. 19 illustrates, via a bottom-up view, an embodiment of a print head carriage mounting plate configured with multiple print heads of each ink color. In the embodiment shown in FIG. 19, the width "W" of the print head carriage is expanded to more than 3 times that ("w") of a single print head 100 by, for each ink color (C, M, Y, K), arranging three such print heads 100a,

100b, 100c of the same color along a given row, and then arranging in another parallel row two additional print heads 100d, 100e, also of the same color, equidistantly offset (along the nozzle axis) between the print heads of the first row so as to ensure nozzle coverage the entire width "W" of the expanded print swath. Additional print heads could be placed in each row to further increase the total print width. Such configuration may be particularly useful in the implementation of a single pass printing system that utilizes print heads that are smaller in width than the desired print width.

The embodiment shown in FIG. 19 is additionally advantageous for allowing increased print resolution. To this end, each set of sockets 412 allocated for each ink color is duplicated. Each socket 412 in one set of sockets has a corresponding socket 412 in the respective duplicate set of sockets (of the same ink color). Each pair of corresponding sockets lie in different rows but the same column in the socket arrangement of the print head carriage mounting plate. In each pair of corresponding sockets 412, one print head is mounted and aligned to first alignment and the other print head is mounted and aligned to a second alignment different than the first alignment. In the embodiment, shown, the first and second alignments are two different spatial offsets. In an alternative embodiment (not shown), the first and second alignments are two different saber angles (with or without different spatial offsets). In other words, print heads in one set of sockets associated with a corresponding ink color are aligned to a first alignment, whereas print heads in the second set of sockets associated with the corresponding ink color are aligned to a second alignment, the second alignment being different than the first alignment. In a preferred embodiment, the first and second alignments are different spatial offsets, the difference between the first and second spatial offsets preferably being ½ of a nozzle pitch. Thus, for example, the ink color Cyan has a first set of sockets 412C Type A dedicated to Cyan ink print heads 100C and a second identical set of sockets 412C Type B also dedicated to Cyan ink print heads 100C and aligned to the same columnar alignment with respect to the plate 410 as the first set of sockets 412C Type A. Print heads are mounted in the first set of sockets 412C Type A according to a first alignment, whereas print heads are mounted in the second set of sockets 412C Type B according to a second alignment that is offset along the nozzle axis by ½ a nozzle pitch. Similarly, the ink color Magenta has a first set of sockets 412M Type A dedicated to Magenta ink print heads 100M and a second identical set of sockets 412M Type B also dedicated to Magenta ink print heads 100M and aligned to the same columnar alignment with respect to the plate 410 as the first set of sockets 412M Type A. Ink colors Yellow and Black have similar Type A and Type B sets of sockets 412Y and 412B.

Of course, FIGS. 18 and 19 detail only two examples of many other configurations that may be implemented according to the principles of the invention. The positions of the print heads on the print head carriage (and there also the corresponding alignment adapter) may vary from printing system to printing system. Additionally, higher print resolution may be achieved using additional sets of print heads offset by smaller and more numerous increments. For example, print resolution may be tripled by using 3 sets of print heads and corresponding print head sockets per color, with each set of print heads aligned by ⅓ of a nozzle pitch with respect to the other print head sets. One will appreciate that additional sets of print heads aligned at smaller fractions of the nozzle pitch can result in even higher resolution. Furthermore, other print head configurations may be implemented to achieve the desired print swath width.

FIG. 20 details the high-level flow operations of an exemplary embodiment of an automated print head alignment tool. The tool includes an alignment system, such as 200 shown in FIGS. 15 and 16, one or more processors (not shown), which may be implemented using a computer system such as described hereinafter with respect to FIG. 22, an operator display such as 591 in FIG. 22, and a graphical user interface which includes a graphical component shown on the operator display, and a processing component which may be executed by one or more processors local to the display or which may be executed remote from the operator, for example at a server. As mentioned, the tool provides a graphical user interface, and embodiment of which is shown at 700 in FIG. 21, through which a human operator may interact with the automated print head alignment tool. In operation, the automated print head alignment tool displays on a display screen a graphical user interface 700 including a plurality of operational controls available to an operator (step 601). In an embodiment, the controls include a Select Alignment Type control 701, a Select Manual Mode control 702, a Select Automatic Mode control 703, a Claim For Affixation control 704, and an Affix Print Head control 705. The graphical user interface 700 monitors the input channels (such as a mouseclick) for operator selection of one of the controls (step 602). The tool then determines which control was selected and operates accordingly. In general, the operator may first select the Select Alignment Type control 701 (step 603) to instruct the tool to align to a regular offset, a ½ pixel offset, or other pre-defined and/or user-defined offsets, and/or select or input a desired saber angle. In an embodiment, when the Select Alignment Type control 701 is selected by the operator, a popup window 750 (shown in FIG. 21A) is displayed, offering the operator available alignment offset options 751 (no offset), 752 (½ pixel offset), 753 (user-defined offset). Selection by the user of either of the pre-defined offset controls 751 or 752 causes the graphical user interface to instruct the tool to set the alignment offset to the corresponding offset value (e.g., 0 or ½ pixel). Upon selection by the user of the control 753, the graphical user interface operates to prompt the user for an offset value and then instructs the tool to set the alignment offset to the value input by the user. In an embodiment, the graphical user interface displays a text or number input box to allow the operator to enter the desired offset value. If the selected control was the Select Alignment Type control 701 (as determined at step 604), the tool determines the selected offset type (e.g., regular, ½ nozzle pitch, user-defined, etc.) (step 605), generally by receiving the offset value selected or input from the operator, and sets the alignment offset within the tool according to the operator-selected alignment type/offset value (step 606).

In an embodiment, the graphical user interface allows the user to select the saber angle. The default saber angle may be set to 0°, such that the nozzle axis is parallel to the print plane (as in FIG. 24A). The graphical user interface may also provide a control to allow the user to select from one or more pre-defined saber angles and/or input a saber angle value.

The operator then generally selects the Manual Alignment mode (or Coarse Alignment) control 702 (step 607). The tool detects the operator input (e.g., selection of the control 702 by a mouse click) and decodes the input to being a request for Manual Alignment mode/Coarse Alignment (step 608). In response, the tool displays an alignment indicator, for example a "+" indicator 711 having a vertical line intersecting a horizontal line, the intersection 712 of which indicates a target position of a first nozzle. Additional alignment indicators may include a horizontal line 713 indicating a target line along which the row of nozzles corresponding to the row in which the first nozzle is located should be., along with one or more alignment controls to allow the user to instruct the tool to align the print head up or down, left or right, or rotate clockwise or counter-clockwise (step 609). The camera(s) obtain an image of the current position of the print head nozzles and displays at least a portion of the captured image in an image area along with alignment indicators 711, 712, 713. FIG. 21 shows a zoomed-in portion of the captured image of the nozzles as captured by one or more of the cameras. The alignment indicators 711, 712, 713 are positioned on the screen in a position relative to the captured image (i.e., a known position) of the alignment adapter aperture. The graphical user interface 700 preferably includes one or more position adjustment controls 731, 732, 733, 734, which operate to allow the operator to manipulate the controls 731, 732, 733, 734 to manually adjust the position and rotation of the print head to align the imaged print head nozzles to the alignment indicator(s) 711, 712, 713 (step 610). The tool monitors the operator input coming in from operator engagement of the print head adjustment controls and translates the input into positioning commands/instructions (step 611) which are sent to the translation stages of the tool to make corresponding positioning adjustments of the print head based on the operator input (step 612).

When the operator is satisfied with the coarse adjustment, the operator will then generally select the Automatic Alignment Mode/Fine Alignment control 703 (step 613). The tool detects the operator input and decodes the input to being a request for Automatic Alignment Mode/Fine Alignment control (step 614). In response, the tool communicates with the cameras to receive image information and automatically determines adjustments in position that need to be made and further automatically generates commands or signals sent to the translation stages to instruct the translation stages to adjust the position of the print head up or down, left or right, or rotate clockwise or counter-clockwise (step 615). The tool utilizes the feedback from the camera(s) to iteratively adjust the position of the print head until the alignment is within a specified tolerance of the alignment specifications. Once aligned, the tool may display an indicator indicating that Automatic/Fine alignment is achieved.

The operator then generally selects the Clamp for Affixation control 704 (step 616). The tool detects the operator input and decodes the input to being a request for Clamp for Affixation (step 617). In response, the tool maintains the translation stages in the current positions to hold the print head stable in its current position relative the alignment adapter socket during subsequent affixation (gluing, bolting, etc.) of the print head to the alignment adapter (step 618).

The operator then generally selects the Affix Print Head to Alignment Adapter control 705 (step 619). The tool detects the operator input and decodes the input to being a request for affixing the print head to the alignment adapter (step 620). In response, the tool and/or operator and/or another automated tool affixes the print head to the alignment adapter while the print head is maintained in the current aligned position relative to its corresponding socket in the alignment adapter (step 621). In an embodiment, the operator applies glue or other adhesive along the edges of the print head where it comes into contact with the walls of the alignment adapter socket. In another embodiment, a robot applies glue in an automated manner along the walls of the socket between the walls of the socket and edges of the print head. In another embodiment, an operator manually bolts or screws the print head in place to the alignment adapter. Alternatively, the bolts or screws are applied in an automated manner by a robot. When bolts or screws are applied, glue or adhesive may also be applied for reinforcement. In an embodiment, where glue or other adhesive is applied, the Affix Print Head to Alignment Adapter control 705 may optionally display a timer (step 622) that may be started by the operator after applying adhesive, or which may be automatically started by one of the robotic affixation tools upon completion of the application of adhesive. If a timer is set, the tool may signal an alert (visual or by sound) when the timer expires indicating that it is safe to remove the alignment adapter from the tool (step 623).

FIG. 22 is a schematic block diagram of a computing environment which may be employed in one or more of the systems or components of the systems described herein, or in which one or more of the automated methods described herein may operate. FIG. 22 illustrates a computer system 510 that may be used to implement any of the servers and computer systems discussed herein. Components of computer 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures.

Computer 510 typically includes a variety of computer readable media. Computer readable media can be any available media that can be accessed by computer 510 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 510. Computer storage media typically embodies computer readable instructions, data structures, program modules or other data.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 22 illustrates operating system 534, application programs 535, other program modules 536, and program data 537.

The computer 510 may also include other removable/non-removable, volatile/nonvolatile computer storage media. By way of example only, FIG. 22 illustrates a hard disk drive 540 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media discussed above and illustrated in FIG. 22 provide storage of computer readable instructions, data structures, program modules and other data for the computer 510. In FIG. 22, for example, hard disk drive 541 is illustrated as storing operating system 544, application programs 545, other program modules 546, and program data 547. Note that these components can either be the same as or different from operating system 534, application programs 535, other program modules 536, and program data 537. Operating system 544, application programs 545, other program modules 546, and program data 547 are given different numbers here to illustrate that, at a minimum, they are different copies. A user may enter commands and information into the computer 510 through input devices such as a keyboard 562 and pointing device 561, commonly referred to as a mouse, trackball or touch pad. Other input devices (not shown) may include a microphone, joystick, game pad, satellite dish, scanner, or the like. These and other input devices are often connected to the processing unit 520 through a user input interface 560 that is coupled to the system bus, but may be connected by other interface and bus structures, such as a parallel port, game port or a universal serial bus (USB). A monitor 591 or other type of display device is also connected to the system bus 521 via an interface, such as a video interface 590. In addition to the monitor, computers may also include other peripheral output devices such as speakers 597 and printer 596, which may be connected through an output peripheral interface 590.

The computer 510 may operate in a networked environment using logical connections to one or more remote computers, such as a remote computer 580. The remote computer 580 may be a personal computer, a server, a router, a network PC, a peer device or other common network node, and typically includes many or all of the elements described above relative to the computer 510, although only a memory storage device 581 has been illustrated in FIG. 22. The logical connections depicted in FIG. 22 include a local area network (LAN) 571 and a wide area network (WAN) 573, but may also include other networks. Such networking environments are commonplace in offices, enterprise-wide computer networks, intranets and the Internet.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the Internet. The modem 572, which may be internal or external, may be connected to the system bus 521 via the user input interface 560, or other appropriate mechanism. In a networked environment, program modules depicted relative to the computer 510, or portions thereof, may be stored in the remote memory storage device. By way of example, and not limitation, FIG. 22 illustrates remote application programs 585 as residing on memory device 581. It will be appreciated that the network connections shown are exemplary and other means of establishing a communications link between the computers may be used.

The print head alignment techniques described herein significantly improve print production efficiency. FIG. 23A shows a resource utilization diagram in terms of time as typically experienced by prior art print head alignment techniques. Generally, as shown, the printer system is operated to print production print jobs until it is time to replace the print heads (step 801). Then, the printing system is taken offline (step 802) and while the printing system is offline, new print heads are attached and aligned to the print head carriage (step 803). As the diagram indicates this step (803) can take hours or even days to accomplish. The printing system then brought back online (step 804) to allow print production to resume.

In contrast, as illustrated by the resource utilization diagram shown in FIG. 23B, using the methodologies of the present invention, while the printing system is operated to print production print jobs using a first set of print heads aligned to corresponding alignment adapter(s) (step 810), a second set of print heads is pre-aligned to a second set of one or more alignment adapter(s) (step 811). Then, when it is time to replace the print heads, the printing system is taken offline (step 812), the print head assemblies including the old print heads and their corresponding $1^{st}$ set of alignment adapters are removed from the print head carriage (step 813), and the pre-aligned print head assemblies (comprising the new print heads pre-aligned to the second set of alignment adapter(s)) are installed on the print head carriage using the cooperating precision alignment features of the alignment adapter(s) and print head carriage (step 814). As the diagram indicates the removal of the old print head assemblies and installation of the new print head assemblies (steps 813 and 814) together take only seconds or minutes. The printing system then brought back online (step 804) to allow print production to resume. The total time the printing system is offline is then only seconds or minutes compared to the hours or days that print head alignment took using prior art methods.

In particular, the method for maximizing print production efficiency, includes printing one or more print jobs using a printing system, the printing system comprising a print head carriage which carries a first set of one or more print heads, a first set of one or more alignment adapters configured to hold the one or more print heads and having a corresponding aperture through which respective nozzles of the respective print heads are exposed, the first set of alignment adapters having precision mounting features configured to engage corresponding cooperating precision mounting features of the print head carriage and which are configured to align the alignment adapter in a predetermined position relative the print head carriage, the printing system further comprising a printing apparatus configured to receive a print substrate on which an image is to be printed and which controls relative movement between the print head carriage and the print substrate to effect printing of the image onto the substrate. The method further includes pre-aligning, during printing of the one or more print jobs using the printing system, one or more print heads to a second set of one or more alignment adapters, wherein the second set of alignment adapters include corresponding one or more apertures through which respective nozzles of the respective print heads are exposed, and further include precision mounting features configured to engage corresponding cooperating precision mounting features of the print head carriage that are configured to align the second set of respective one or more alignment adapters in corresponding predetermined positions relative the print head carriage.

The method further includes halting printing production by taking the printing system offline, removing the first set of print heads and corresponding first set of alignment adapters from the print head carriage, engaging the precision mounting features of the second set of alignment adapters with corresponding cooperating precision mounting features of the print head carriage to align the second set of alignment adapters with pre-aligned print heads mounted thereon to the print head carriage, and resuming printing production by the printing system.

In summary, the print head alignment techniques described herein may be used to significantly reduce the amount of time required swap out and align print heads from a print head carriage of a printing system. Further, the print head alignment techniques may be used to increase print resolution through print head alignment versus mechanical design. For example, given a print head with 360 nozzles (e.g., which prints 350 dpi), the print resolution may be increased to print at 720 dpi by shifting (through alignment) every "second" print head by half a pixel distance to print at 720 dpi in one pass (double resolution). Prior art solutions achieved an increase in print resolution by designing a ½ pixel mechanical shift into the carriage plate hardware itself. Using the novel digital offset the vision alignment system described herein, print resolution can be increased without having to machine the shift into the carriage mounting plate.

Those of skill in the art will appreciate that various features of the invented methods and apparatuses described and illustrated herein may be implemented in software, firmware or hardware, and/or any suitable combination thereof. Those of skill in the art will appreciate that for those automated features of the invention, such as the automated alignment process and the graphical user interface, such features may be implemented by a computer in which instructions are executed, the instructions being stored for execution on a computer-readable medium and being executed by any suitable instruction processor. Alternative embodiments are contemplated, however, and are within the spirit and scope of the invention.

What is claimed is:

1. A method for pre-aligning a print head to an alignment adapter, the print head comprising a plurality of nozzles through which ink is ejected during printing, comprising:
    placing a print head in a predetermined position on the alignment adapter;
    obtaining a camera image of the print head nozzles relative to one or more features of the alignment adapter;
    locating a first nozzle in the image;
    locating a first row of nozzles in the image of the print head nozzles;
    adjusting a position of the print head to align a first nozzle of the print head to a target position based on image feedback showing changes to the position of the first nozzle of the print head based on the positional adjustments;
    adjusting a rotational angle of the print head to align the first row of nozzles to a target angle based on image feedback showing changes to the position of the first nozzle of the print head based on the positional adjustments.

2. The method of claim 1, further comprising:
    locating a plurality of additional nozzles in the image;
    performing linear regression based on positions of the first nozzle and plurality of additional nozzles to locate the first row of nozzles in the image.

* * * * *